(12) United States Patent
Van Weelden et al.

(10) Patent No.: US 11,970,987 B2
(45) Date of Patent: *Apr. 30, 2024

(54) SYSTEMS AND METHODS FOR VARIABLE COMPRESSION RATIO PHASER HAVING A DUAL TORSION SPRING ARRANGEMENT

(71) Applicant: HUSCO Automotive Holdings LLC, Waukesha, WI (US)

(72) Inventors: Curtis L. Van Weelden, Waukesha, WI (US); Dean Wardle, Oconomowoc, WI (US); Bryce Johnson, Pewaukee, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,031

(22) Filed: Mar. 15, 2023

(65) Prior Publication Data
US 2023/0323825 A1 Oct. 12, 2023

Related U.S. Application Data

(60) Provisional application No. 63/320,992, filed on Mar. 17, 2022.

(51) Int. Cl.
*F02D 15/04* (2006.01)
*F02B 75/04* (2006.01)
(Continued)

(52) U.S. Cl.
CPC ............ *F02D 15/04* (2013.01); *F02B 75/047* (2013.01); *F16C 3/28* (2013.01); *F16H 21/20* (2013.01); *F16C 2360/22* (2013.01)

(58) Field of Classification Search
None
See application file for complete search history.

(56) References Cited

U.S. PATENT DOCUMENTS 5,433,179 A     7/1995  Wittry
8,074,612 B2 *  12/2011 Shin ................. F02D 15/02
                                                123/48 B
(Continued)

FOREIGN PATENT DOCUMENTS

CN    114076028 A  *  2/2022  ............ F16D 43/26
EP      2282019 A1     2/2011
(Continued)

OTHER PUBLICATIONS

European Patent Office, Extended Search Report, Application No. 23162652.4, dated Jul. 14, 2023, 8 pages.

*Primary Examiner* — Kevin R Steckbauer
(74) *Attorney, Agent, or Firm* — Quarles & Brady LLP

(57) ABSTRACT

A phasing system for varying a rotational relationship between a first rotary component and a second rotary component includes a gear hub and a cradle rotor. A spider rotor is arranged between the gear hub and the cradle rotor to selectively lock and unlock relative rotation between the gear hub and the cradle rotor. A torsion spring is coupled between the gear hub and the cradle rotor to apply a torque load between the gear hub and the cradle rotor. A planetary actuator is coupled to the gear hub and the spider rotor. The planetary actuator is operable between a steady-state mode, in which relative rotation between the gear hub and the cradle rotor is inhibited, and a phasing mode, in which the planetary actuator receives a rotary input at a predetermined magnitude to selectively provide a relative rotation between the gear hub and the cradle rotor.

20 Claims, 21 Drawing Sheets

(51) Int. Cl.
*F16C 3/28* (2006.01)
*F16H 21/20* (2006.01)

(56) References Cited

U.S. PATENT DOCUMENTS

| | | | |
|---|---|---|---|
| 8,678,157 B2 * | 3/2014 | Ward | F16D 7/022 |
| | | | 474/94 |
| 8,794,200 B2 | 8/2014 | Jacques et al. | |
| 9,212,731 B2 * | 12/2015 | Lindstrom | F16H 7/1218 |
| 10,100,726 B2 * | 10/2018 | De Gooijer | F02B 75/048 |
| 10,711,692 B2 * | 7/2020 | Kamo | F16H 19/001 |
| 11,268,437 B2 * | 3/2022 | Gautier | F02B 75/045 |
| 11,428,173 B2 * | 8/2022 | Hrusch | F02B 75/047 |
| 11,674,573 B2 * | 6/2023 | Van Weelden | F16H 35/008 |
| | | | 74/829 |
| 2004/0045522 A1 | 3/2004 | Raffaele et al. | |
| 2008/0173281 A1 | 7/2008 | Jurging et al. | |
| 2009/0241910 A1 * | 10/2009 | Shin | F02B 75/048 |
| | | | 123/48 B |
| 2011/0023834 A1 * | 2/2011 | von Mayenburg | F02D 15/02 |
| | | | 123/48 B |
| 2012/0298474 A1 * | 11/2012 | Ward | F16H 55/36 |
| | | | 192/41 S |
| 2015/0031485 A1 * | 1/2015 | Lindstrom | F16H 7/1218 |
| | | | 474/135 |
| 2015/0219022 A1 | 8/2015 | Nagai et al. | |
| 2017/0009648 A1 * | 1/2017 | De Gooijer | F02B 75/02 |
| 2017/0096934 A1 * | 4/2017 | Tang | F01M 11/02 |
| 2018/0258846 A1 * | 9/2018 | Kamo | F16H 19/001 |
| 2019/0032522 A1 | 1/2019 | Balding | |
| 2019/0032553 A1 * | 1/2019 | Sokalski | F04B 1/07 |
| 2019/0323390 A1 * | 10/2019 | Balding | F02D 15/02 |
| 2020/0318535 A1 * | 10/2020 | Gautier | F02D 15/02 |
| 2021/0396174 A1 | 12/2021 | Hrusch | |
| 2022/0049759 A1 * | 2/2022 | Van Weelden | F16D 43/26 |
| 2022/0106916 A1 * | 4/2022 | Hrusch | F16D 3/10 |
| 2022/0136600 A1 * | 5/2022 | Kelleher | B25B 21/00 |
| | | | 74/335 |
| 2022/0195898 A1 * | 6/2022 | Van Weelden | F16D 41/067 |
| 2023/0323825 A1 * | 10/2023 | Van Weelden | F16C 3/28 |
| | | | 123/48 B |

FOREIGN PATENT DOCUMENTS

| | | | | |
|---|---|---|---|---|
| EP | 3121395 A1 | | 1/2017 | |
| EP | 3957835 A1 * | | 2/2022 | F16D 43/26 |
| JP | 5695272 B2 * | | 4/2015 | F16D 41/206 |
| JP | 2022033717 A * | | 3/2022 | F16D 43/26 |
| WO | 03056141 A1 | | 7/2003 | |
| WO | WO-2015013570 A2 * | | 1/2015 | F16H 7/1218 |

* cited by examiner

SYSTEMS AND METHODS FOR VARIABLE COMPRESSION RATIO PHASER HAVING A DUAL TORSION SPRING ARRANGEMENT

CROSS-REFERENCES TO RELATED APPLICATIONS

This application claims the benefit of U.S. Provisional Patent Application No. 63/320,992, filed Mar. 17, 2022, which is incorporated herein by reference in its entirety.

STATEMENT REGARDING FEDERALLY SPONSORED RESEARCH

Not applicable.

BACKGROUND

In general, rotational phasing systems for rotary applications (e.g., engines, motors, etc.) may include a first component and a second component that can be rotationally phased from the first component.

BRIEF SUMMARY

In some aspects, the present disclosure can provide a variable compression ratio (VCR) phasing system for varying a rotational relationship between a crank shaft and an eccentric shaft. The system can include a gear hub that can be configured to be in rotational communication with a crank shaft and a cradle rotor that can be configured to be in rotational communication with an eccentric shaft. A spider rotor can be arranged between the gear hub and the cradle rotor. The spider rotor can be configured to selectively lock and unlock relative rotation between the gear hub and the cradle rotor, and a planetary actuator can be coupled to the gear hub and the spider rotor. The planetary actuator can be configured to receive a rotary input and to provide a corresponding rotary output to the spider rotor to unlock relative rotation between the cradle rotor and the gear hub. A first torsion spring and a second torsion spring can be coupled between the gear hub and the cradle rotor. The first and second torsion springs can be configured to apply a first torque load in a first direction between the gear hub and the cradle rotor, which can offset a second torque load applied in a second direction by at least one of the eccentric shaft and the crank shaft. In some cases, the first torque load can be between about 5 Nm and about 200 Nm.

In some non-limiting examples, the VCR phasing system can further include a spring sleeve coupled to the gear hub. The spring sleeve can extend axially away from the gear hub and can define an interior cavity. A coil portion of each of the first torsion spring and the second torsion spring can circumferentially extend around an outside of the spring sleeve.

In some non-limiting examples, the first torsion spring and second torsion spring can each include a first coil end and a second coil end opposite the first coil end with the coil portion arranged therebetween. The first coil end of the first torsion spring and the first coil end of the second torsion spring can be in engagement with the cradle rotor. The second coil end of the first torsion spring and the second coil end of the second torsion spring can be in engagement with a spring seat, which can be coupled to the spring sleeve. In some cases, the spring seat can be configured to be rotationally locked with the spring sleeve in a plurality of rotational positions. Each of the plurality of rotational positions can define a unique combined torque load from the first and second torsion springs.

In some non-limiting examples, the spring sleeve can include a plurality of first slots and the spring seat can include a plurality of second slots. The plurality of first slots and the plurality of second slots can be arranged so that selective alignment between two first slots among the plurality of first slots with two second slots among the plurality of second slots can be configured to rotationally lock the spring sleeve to the spring seat. The two first slots and the two second slots, when aligned, together can form a first and second keyway that can be configured to receive a first key and a second key, respectively.

In some non-limiting examples, the first torsion spring can define a spring envelope in an axial direction and a radial direction. The second torsion spring can be arranged within the spring envelope. In some cases, the first torsion spring can define a first coil diameter and the second torsion spring can define a second coil diameter. The first coil diameter can be the same as (i.e., equal to) the second coil diameter. In some cases, the first torsion spring and the second torsion spring can be arranged in a nested configuration. A coil of the second torsion spring can be arranged axially between two adjacent coils of the first torsion spring.

In some aspects, the present disclosure can provide a phasing system for varying a rotational relationship between a first rotary component and a second rotary component. The phasing system can include a gear hub, a cradle rotor, and a spider rotor. The spider rotor can be arranged between the gear hub and the cradle rotor and can be configured to selectively lock and unlock relative rotation between the gear hub and the cradle rotor. A torsion spring can be coupled between the gear hub and the cradle rotor. The torsion spring can be configured to apply a first torque load between the gear hub and the cradle rotor. The phasing system can also include a planetary actuator coupled to the gear hub and the spider rotor. The planetary actuator can be operable between a steady-state mode and a phasing mode. In the steady-state mode rotation between the gear hub and the cradle rotor can be inhibited. In the phasing mode the planetary actuator can receive a rotary input at a predetermined magnitude to selectively provide a relative rotation between the gear hub and the cradle rotor.

In some non-limiting examples, the phasing system can further include a spring sleeve coupled to the hear hub. The spring sleeve can extend axially away from the gear hub. The torsion spring can include a first torsion spring and a second torsion spring that each can include a first coil end and a second coil end opposite the first coil end. The first coil end of the first torsion spring and the first coil end of the second torsion spring can be in engagement with the cradle rotor. The second coil end of the first torsion spring and the second coil end of the second torsion spring can be in engagement with a spring seat, which can be coupled to the spring sleeve.

In some non-limiting examples, the spring seat can be configured to be rotationally locked with the spring sleeve in a plurality of rotational positions. Each of the plurality of rotational positions can define a unique combined torque load from the first and second torsion springs. The first torsion spring can define a first coil diameter and the second torsion spring can define a second coil diameter. The first coil diameter can be the same as (i.e., equal to) the second coil diameter. In some cases, the first torsion spring and the second torsion spring can be arranged in a nested configuration, in which a coil of the second torsion spring can be arranged axially between two adjacent coils of the first torsion spring.

In some aspects, the present disclosure can provide a variable compression ratio (VCR) phasing system for varying rotational relationship between a crank shaft and an eccentric shaft. The VCR system can include a gear hub configured to be in rotational communication with a crank shaft and a cradle rotor configured to be in rotational communication with an eccentric shaft. A spider rotor can be arranged between the gear hub and the cradle rotor. The spider rotor can be configured to receive an input to selectively lock and unlock relative rotation between the gear hub and the cradle rotor. A spring sleeve coupled to and rotationally fixed with the gear hub. A first torsion spring can be coupled between the gear hub and the cradle rotor, and a second torsion spring can be coupled between the gear hub and the cradle rotor. The first and second torsion springs can be configured to apply a combined torque load between the gear hub and the cradle rotor. A preload of the first and second torsion springs can be set by coupling first ends of the first and second torsion springs to cradle the rotor, coupling opposing second ends of the first and second torsion springs to a spring seat, and rotating the spring seat relative to the spring sleeve to selectively align at least one first slot among a plurality of first slots arranged on the spring sleeve with at least one second slot among a plurality of second slots arranged on the spring seat. The selective alignment of the at least one first slot and the at least one second slot can be configured to rotationally lock the spring sleeve to the spring seat.

In some non-limiting examples, when a phase angle between the gear hub and the cradle rotor is at a minimum phase angle, the combined torque load provided by the first and second torsion springs can be at a minimum torque load. As the phase angle increases between the gear hub and the cradle rotor, the combined torque load provided by the first and second torsion springs can increase.

In some aspects, the present disclosure can provide a phasing system for varying a rotational relationship between a first rotary component and a second rotary component. The phasing system can include a gear hub configured to couple to the first rotary component and a cradle rotor configured to couple to the second rotary component. A spider rotor can be arranged between the gear hub and the cradle rotor and can be configured to selectively lock and unlock relative rotation between the gear hub and the cradle rotor. A planetary actuator can be coupled to the gear hub and the spider rotor. The planetary actuator can be configured to receive a rotary input and to provide a corresponding rotary output to the spider rotor to unlock relative rotation between the cradle rotor and the gear hub. A torsion spring can be coupled between the gear hub and the cradle rotor. The torsion spring can be configured to apply a first torque load in a first direction between the gear hub and the cradle rotor to offset a second torque load applied in a second direction by at least one of the first rotary component and the second rotary component. In some cases, the first torque load can be between about 5 Nm and about 200 Nm.

In some non-limiting examples, the phasing system can include a spring sleeve coupled to the gear hub. The spring sleeve can extend axially away from the gear hub and can define an interior cavity. A coil portion of the torsion spring can circumferentially extend around an outside of the spring sleeve.

In some non-limiting examples, the torsion spring can include a first torsion spring and a second torsion spring. Each of the first torsion spring and the second torsion spring can include a first coil end and a second coil end opposite the first coil end, with the coil portion arranged therebetween. The first coil end of the first torsion spring and the first coil end of the second torsion spring can be in engagement with the cradle rotor. The second coil end of the first torsion spring and the second coil end of the second torsion spring can be in engagement with a spring seat, which can be coupled to the spring sleeve. In some cases, the spring seat can be configured to be rotationally locked with the spring sleeve in a plurality of rotational positions. Each of the plurality of rotational positions can define a unique combined torque load from the first torsion spring and the second torsion spring that corresponds with the first torque load.

In some cases, the first and second torsion springs can be configured to have a preload set by coupling first ends of the first and second torsion springs to the cradle rotor, coupling opposing second ends of the first and second torsion springs to a spring seat, and rotating the spring seat relative to the spring sleeve to selectively align at least one first slot among a plurality of first slots arranged on the spring sleeve with at least one second slot among a plurality of second slots arranged on the spring seat.

In some non-limiting examples, the spring sleeve can include a plurality of first slots and the spring seat includes a plurality of second slots. The plurality of first slots and the plurality of second slots can be arranged so that selective alignment between two first slots among the plurality of first slots with two second slots among the plurality of second slots can be configured to rotationally lock the spring sleeve to the spring seat. The two first slots and the two second slots, when aligned, together can form a first and second keyway that can be configured to receive a first key and a second key, respectively.

In some cases, the first torsion spring can define a spring envelope in an axial direction and a radial direction. The second torsion spring can be arranged within the spring envelope. In some cases, the first torsion spring can define a first coil diameter and the second torsion spring can define a second coil diameter. The first coil diameter can be the same as (i.e., equal to) the second coil diameter. In some cases, the first torsion spring and the second torsion spring can be arranged in a nested configuration. A coil of the second torsion spring can be arranged axially between two adjacent coils of the first torsion spring.

In some non-limiting examples, the planetary actuator can be operable between a steady-state mode and a phasing mode. In the steady-state mode rotation between the gear hub and the cradle rotor can be inhibited. In the phasing mode the planetary actuator can receive a rotary input at a predetermined magnitude to selectively provide a relative rotation between the gear hub and the cradle rotor.

In some non-limiting examples, the torsion spring can be configured so that the first torque load is a minimum torque load when a phase angle between the gear hub and the cradle rotor is at a minimum phase angle. In some cases, the first torque load can increase as phase angle increases between the gear hub and the cradle rotor.

In some aspects, the present disclosure can provide for a variable compression ratio phasing system comprising a phasing system for varying a rotational relationship between a first rotary component and a second rotary component. The first rotary component can be configured as a crankshaft and the second rotary component can be configured as an eccentric shaft, or vice versa.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
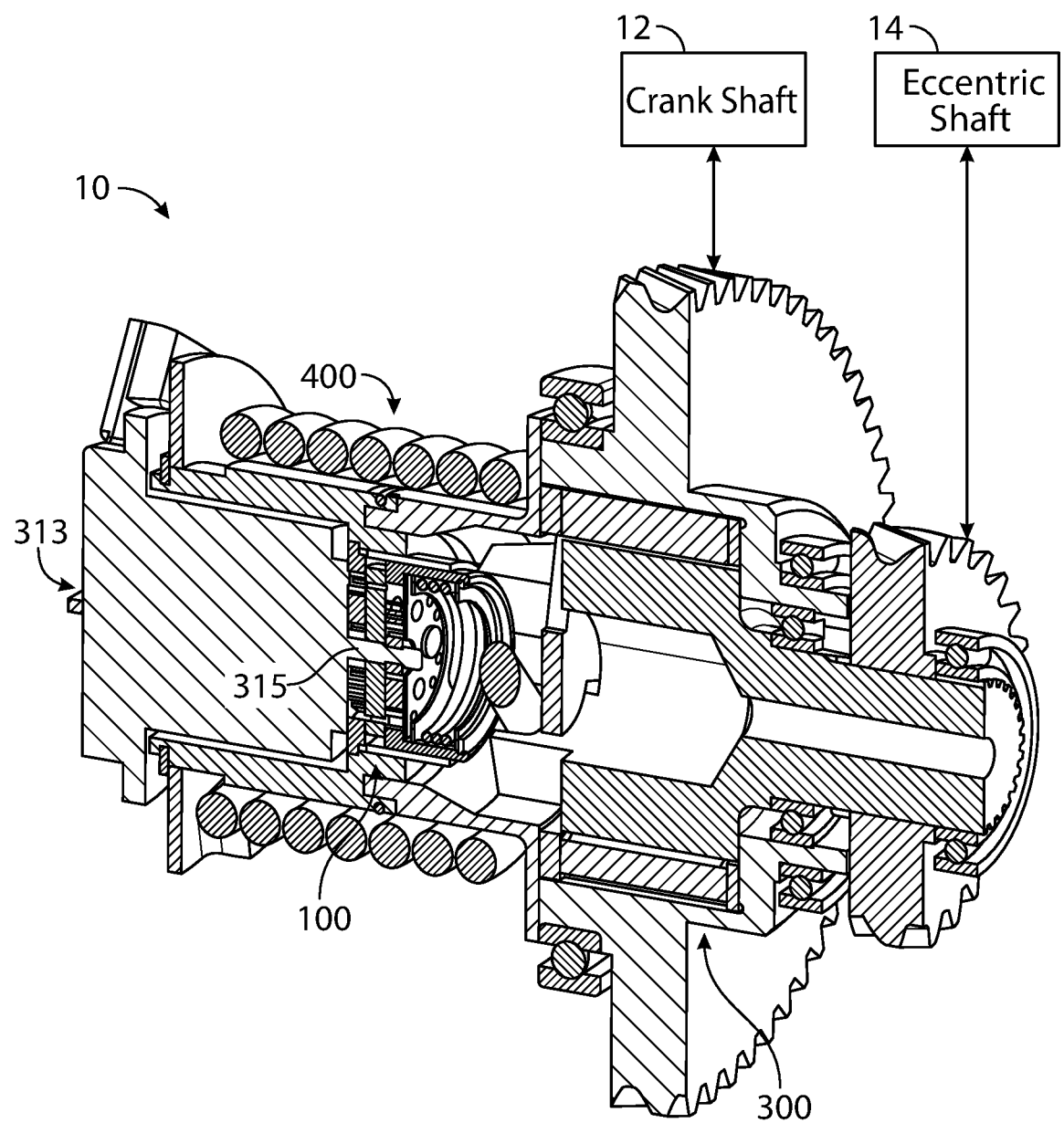
FIG. 1 is a perspective view of a cross-section of a rotational phasing system according to one aspect of the present disclosure.

The use herein of the term "axial" and variations thereof refers to a direction that extends generally along an axis of symmetry, a central axis, or an elongate direction of a particular component or system. For example, axially extending features of a component may be features that extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference of an object or around an axis of symmetry, a central axis or an elongate direction of a particular component or system.

Conventional rotational phasing (i.e., selective relative rotation or rotational offset) systems require an input mechanism to apply a force, or displacement, to achieve a desired relative rotation (e.g., phase angle) between two components. In some systems, an axial/linear input is provided by an actuator. The amount of force required to facilitate the desired phasing exponentially increases the cost of conventional phasing systems. In addition, the amount of relative rotation provided by the phasing system increases a height of the phasing system. That is, as the amount of relative rotation needed in a given application increases, the actuator providing the axial/linear input is required to increase in stroke, which increases a height of the actuator and the overall packaging size of the phasing system.

Generally, the present disclosure provides systems and methods for selectively controlling relative rotation in rotary systems. In some non-limiting examples, a planetary actuator may be configured to be coupled between a rotary actuator and a two-way locking mechanism (e.g., a two-way clutch or phasing mechanism). The locking mechanism can be coupled between two rotary components. For example, a first rotary component may be driven by an external source at a desired rotational speed, and a second rotary component may be rotationally driven by the locking mechanism. The planetary actuator may also rotate with the locking mechanism. The rotary actuator can apply an input to the planetary actuator, which can be configured to allow selective relative rotation between the first rotary component and the second rotary component. For example, the planetary actuator may be configured to rotationally displace/force a portion of the locking mechanism to provide a predetermined relative rotation in a desired direction between the first rotary component and the second rotary component to adjust a rotational offset (i.e., phase angle) therebetween.

The use of a planetary actuator according to the present disclosure may reduce an axial height of a phasing system due to the use of a rotary displacement/force, rather than an axial/linear displacement/force to facilitate the relative rotational motion. In addition, the amount of force required to achieve the relative rotational motion may be substantially reduced when compared to conventional phasing systems, which can reduce a cost of a phasing system utilizing the planetary actuator.

FIG. 1 illustrates one non-limiting example of a rotational phasing system 10 according to the present disclosure. In some non-limiting examples, the rotational phasing system 10 may be utilized in a variable compression ratio (VCR) system on an internal combustion engine to facilitate selective rotational phasing (i.e., a predetermined amount of relative rotation) between a crank shaft and an eccentric shaft. Such VCR system arrangements are described in U.S. Patent Application Publication No. US 2019/0323390. The rotational phasing system 10 can be rotationally driven by a crank shaft 12. For example, the crank shaft 12 can have a gear fixed thereto that rotates with the engine crank shaft. As will be described herein, the crank shaft gear can mesh with and provide rotational drive input to a first gear (e.g., first gear 311, see FIG. 9) coupled to the rotational phasing system 10. The rotational phasing system 10 may then rotationally drive an eccentric shaft 14. For example, the eccentric shaft 14 can have a gear fixed thereto that rotates with the eccentric shaft 14. As will be described herein, the eccentric shaft gear can mesh with and receive rotational drive input from a second gear (e.g., second gear 332, see FIG. 9) coupled to the rotational phasing system 10. In general, the rotational position of the eccentric shaft 14 can be shifted with respect to the crank shaft 12, for example, to change a compression ratio of an internal combustion engine. For example, the rotational position of the eccentric shaft 14 can be shifted relative to the rotational position of the crank shaft 12 by angularly displacing the eccentric shaft 14. As will be described in detail below, the rotational phasing system 10 facilitates the selective rotational phasing (i.e., a predetermined amount of relative rotation or angular displacement) between the crank shaft 12 and the eccentric shaft 14.

In the illustrated non-limiting example, the rotational phasing system 10 may include a planetary actuator 100 and a mechanical phasing assembly 300 in the form of a locking mechanism. In some applications, the planetary actuator 100 may be utilized to directly or indirectly drive or initiate the phasing between the crank shaft and the eccentric shaft. In the illustrated non-limiting example, the planetary actuator 100 may be utilized in conjunction with a mechanical phasing assembly 300 (e.g., a locking mechanism or two-way clutch) that is coupled between the eccentric shaft 14 and the crank shaft 12 to selectively allow relative rotation therebetween. In these applications, the planetary actuator 100 may be configured to provide a predetermined amount of rotational force/displacement to the locking mechanism, which is determined by the rotational input provided thereto. In the illustrated non-limiting example, the rotational phasing system 10 can include a rotary actuator 313 to provide the rotational input to the planetary actuator 100 to selectively vary an alignment (e.g., a rotational alignment) between two ring gears of the planetary actuator 100 at a predetermined magnitude as the planetary actuator 100 rotates. As will be described, the rotary input provided by the rotary actuator 313 facilitates selective relative rotation between the eccentric shaft 14 and the crank shaft 12 in a desired direction.

Figure 2:
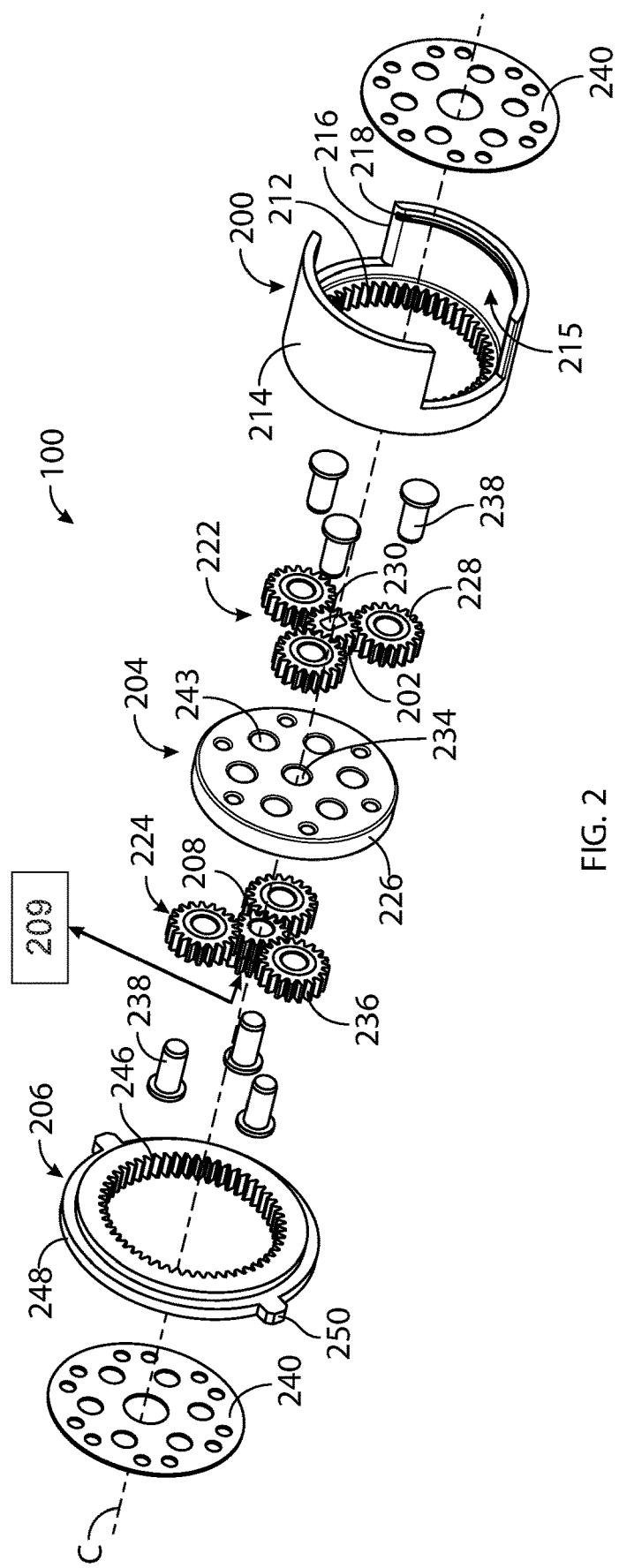
FIG. 2 is an exploded view of a planetary actuator of the rotational phasing system of FIG. 1.

As shown in FIG. 2, the illustrated non-limiting example of the planetary actuator 100 may include a first ring gear 200, a first sun gear 202, a carrier assembly 204, a second ring gear 206, a second sun gear 208, and an input shaft 315 (see FIG. 1). In the illustrated non-limiting example, the components of the planetary actuator 100 may be arranged along a common central axis C.

The first ring gear 200 may include an inner, geared surface 212 and an outer surface 214. The geared surface 212 may extend radially inward from an axial end of the first ring gear 200 and may include a plurality of gear teeth extending circumferentially around the geared surface 212. The outer surface 214 of the first ring gear 200 extends axially from a radially outer edge of the first ring gear 200 to form a cavity 215 within the first ring gear 200. The outer surface 214 may include one or more slots 216. In the illustrated nonlimiting example, the outer surface 214 includes a plurality of slots 216, which are formed as rectangular cutouts in the first ring gear 200 and extend axially along a portion of the length of the outer surface 214. In the illustrated non-limiting example, the first ring gear 200 includes two slots 216 equally spaced circumferentially around the outer surface 214 (e.g., circumferentially spaced apart by 180 degrees). In other non-limiting examples, the first ring gear 200 may include more or less than two slots 216 arranged in any increments circumferentially around the outer surface 214.

The axial end from which the slots or cutouts 216 extend into may be arranged on an axially-opposing side of the first ring gear 200 compared to the geared surface 212. When the planetary actuator 100 is assembled into the rotational phasing system 10, as will be described herein, one or more compliance members (e.g., compliance members 348, see FIG. 9) can be received within the cavity 215 and can be configured to apply a force to an edge of the slots 216. The first ring gear 200 can also include a snap ring groove 218 configured to receive a snap ring to maintain an axial position of the compliance members in an assembly.

With continued reference to FIG. 2, the carrier assembly 204 may include a first set of planet gears 222, a second set of planet gears 224, and a carrier plate 226. The first set of planet gears 222 and the second set of planet gears 224 may be arranged on axially opposing sides of the carrier plate 226. In the illustrated non-limiting example, the first set of planet gears 222 may include three planet gears 228 arranged circumferentially around and meshed with the first sun gear 202. In other non-limiting examples, the first set of planet gears 222 may include more or less than three planet gears 228 arranged circumferentially around and meshed with the first sun gear 202.

In the illustrated non-limiting example, the first sun gear 202 may be centrally arranged with respect to the planet gears 228 and may include a coupling aperture 230 extending axially therethrough. The coupling aperture can be configured to rotationally couple the input shaft 315 to be rotationally coupled to the first sun gear 202 for rotation therewith. Accordingly, the coupling aperture 230 may define a keyed or rectangular recess to receive an input shaft 315 from a rotary actuator 313 (see FIG. 1) to rotate the first sun gear 202 such that the input shaft 315 and the first sun gear 202 rotate with one another. In other non-limiting examples, the coupling aperture 230 may define any geometric shape (e.g., oval, square, triangular, polygonal, etc.) that enables the input shaft 315 to be rotationally coupled to the first sun gear 202 for rotation therewith. It is to be understood that the input shaft 315 of the rotary actuator 313 can have an end that extends axially into the first sun gear 202 and defines a generally complementary shape to match the shape defined by coupling aperture 230 of the first sun gear 202. In this way, for example, the end of the input shaft 315 may be inserted into the coupling aperture 230 to enable the input shaft 315 to be rotationally coupled to the first sun gear 202, such that the input shaft 315 and the first sun gear 202 rotate with one another.

The input shaft 315 from the rotary actuator 313 may be received within and inserted through a center aperture 234 that extends axially through the carrier plate 226. The input shaft 315 may also extend axially through the second sun gear 208 to engage the first sun gear 202. Although the input shaft 315 extends through the second sun gear 208, the first sun gear 202 may be independently rotatable relative to the second sun gear 208. In some non-limiting examples, a snap ring (not shown) may be used on an end of the input shaft 315 adjacent to the first sun gear 202 to prevent the input shaft 315, and thereby the first sun gear 202, from displacing axially relative to the carrier plate 226.

In the illustrated non-limiting example, the second set of planet gears 224 may include three planet gears 236 arranged circumferentially around and meshed with the second sun gear 208. In other non-limiting examples, the second set of planet gears 224 may include more or less than three planet gears 236 arranged circumferentially around and meshed with the second sun gear 208. The second sun gear 208 may be arranged centrally with respect to the planet gears 236 and may define an axial height that is sufficient to ensure at least a portion of the second sun gear 208 protrudes axially past the planet gears 236. That is, the second sun gear 208 defines an axial height that is greater than the axial height defined by the planet gears 236 to allow at least a portion of the second sun gear 208 to axially protrude past the planet gears 236 (e.g., in a direction away from the carrier plate 226).

The planet gears 228 of the first set of planet gears 222 and the planet gears 236 of the second set of planet gears 224 may be axially fixed relative to the carrier plate 226. For example, as illustrated in FIG. 2, the carrier assembly 204 may include a plurality of bearing rods 238 and one or more ring plates 240. In some non-limiting examples, each of the plurality of bearing rods 238 may include a groove (not shown) arranged on a distal end thereof opposite a flanged end of the bearing rods 238. The groove may extend radially inwardly into the respective bearing rod 238. Each of the bearing rods 238 may be axially inserted through one of the ring plates 240, then through either one of the planet gears 228 of the first set of planet gears 222 or one of the planet gears 236 of the second set of planet gears 224, then through a rod aperture 243 in the carrier plate 226. In some non-limiting examples, a snap ring (not shown) may be inserted into each of the grooves to prevent, for example, each of the planet gears 228 of the first set of planet gears 222 and each of the planet gears 236 of the second set of planet gears 224 from displacing axially relative to the carrier plate 226.

With continued reference to FIG. 2, the second ring gear 206 may include an inner, geared surface 246, a flange 248, and one or more tabs 250. The geared surface 246 may include a plurality of gear teeth extending circumferentially around the geared surface 246. The flange 248 may extend radially outwardly from an axial end of the second ring gear 206. The tabs 250 can extend radially outward from the flange 248. In the illustrated non-limiting example, the tabs 250 are arranged on circumferentially opposed sides of the flange 248. As will be described herein, the tabs 250 of the second ring gear 206 can be configured to rotationally lock the second ring gear to a spring sleeve for rotation therewith.

In general, one of the first sun gear 202 and the second sun gear 208 may be rotationally fixed (e.g., to a housing of the rotary actuator) to prevent relative rotation therebetween, while permitting the input shaft 315 to rotate relative to the other of the first sun gear 202 and the second sun gear 208. For example, in the illustrated non-limiting example of FIGS. 1-2, the second sun gear 208 may be coupled to an anti-rotation ring 209 to rotationally lock the second sun gear 208 to the rotary actuator housing. The axial protrusion of the second sun gear 208 past the planet gears 236 of the second set of planet gears 224 can provide access to the second sun gear 208 for the anti-rotation ring to be axially inserted over a portion of the second sun gear 208. It is to be understood that the anti-rotation ring can include an inner surface that matches the gear profile of the second sun gear 208 to enable the inner surface to be axially inserted and rotationally locked onto the second sun gear 208. Correspondingly, the anti-rotation ring may be coupled to an external component that is rotationally fixed, such as a housing of the rotary actuator, which prevents rotation of the anti-rotation ring, and thereby the second sun gear 208. In some non-limiting examples, the first sun gear 202 may be rotationally fixed and the second sun gear 208 may be coupled to the input shaft 315 for rotation therewith (e.g., so that the second sun gear 208 includes a coupling aperture to be rotationally locked onto the input shaft 315 and so that the input shaft 315 extends axially through the first sun gear 202 so that the first sun gear 202 may be independently rotatable relative to the second sun gear 208 and input shaft 315, in accordance with the preceding description).

Figure 3:
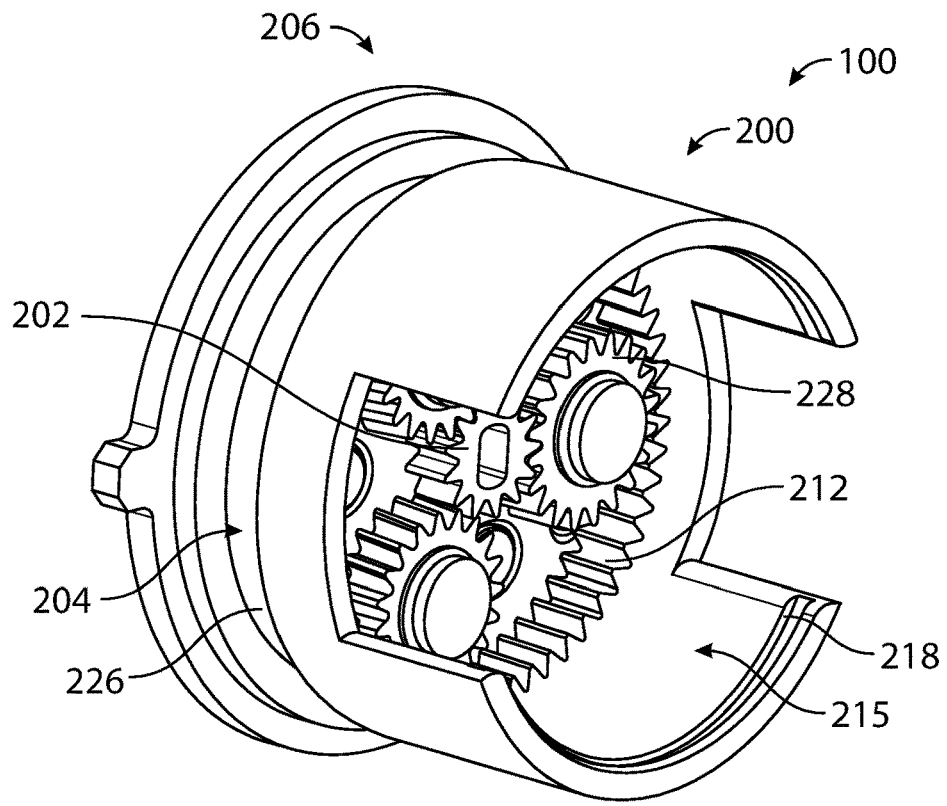
FIG. 3 is a rear perspective view of the planetary actuator of FIG. 2, with a ring plate removed to show the internal gear arrangement.
Figure 4:
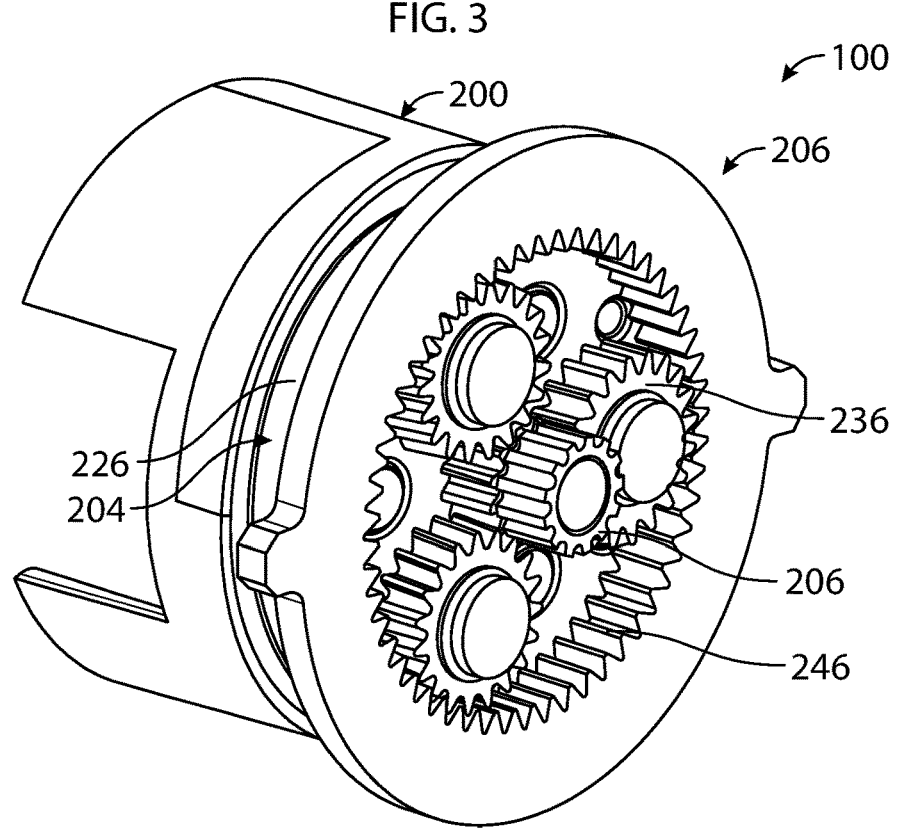
FIG. 4 is a front perspective view of the planetary actuator of FIG. 3, with a ring plate removed to show the internal gear arrangement.

Referring now to FIGS. 3-4, the assembled carrier assembly 204 may be inserted at least partially into the cavity 215 of the first ring gear 200, such that the geared surface 212 meshes with the planet gears 228 of the first set of planet gears 222. The second ring gear 206 may be inserted onto the carrier assembly 204, such that the geared surface 246 meshes with the planet gears 236 of the second set of planet gears 224.

In general, during operation of the planetary actuator 100, the first ring gear 200 and the second ring gear 206 may be able to rotate freely in a desired direction. For example, with the geared surface 212 meshed with the planet gears 228 of the first set of planet gears 222, the first ring gear 200 may be able to rotate about the first sun gear 202. Similarly, the with the geared surface 246 meshed with the planet gears 236 of the second set of planet gears 224, the second ring gear 206 may be able to rotate about the second sun gear 208.

Since the second sun gear 208 may be rotationally fixed relative to the planetary actuator 100, the first sun gear 202 may be selectively rotated to alter a rotational relationship between the first ring gear 200 and the second ring gear 206. For example, the input shaft 315 of the rotary actuator 313 (see FIG. 1) may be selectively rotated a desired rotational magnitude in a first direction, which, in turn, rotates the first sun gear 202 rotationally coupled to the input shaft 315 in the first direction. The rotation of the first sun gear 202 in the first direction may result in rotation of planet gears 228 of the first set of planet gears 222 in a second direction that is opposite to the first direction which in turn, rotates the first ring gear 200 relative to the second ring gear 206 in the second direction.

A magnitude of the relative rotation (i.e., rotational offset or phase angle), between the first ring gear 200 and the second ring gear 206 may be dependent on the gear ratio defined between the input shaft 315 and the first ring gear 200. For example, a resultant gear ratio that accounts for each of the gear ratio between the input shaft 315 to the first sun gear 202, the gear ratio between the first sun gear 202 and the planet gears 228 of the first set of planet gears 222, and the gear ratio between the planet gears 228 of the first set of planet gears 222 and the first ring gear 200. In any case, with the resultant gear ratio known, the number of degrees that the input shaft 315 is rotated may correlate with a known number of degrees that the first ring gear 200 is rotated relative to the second ring gear 206. Thus, a direction and magnitude of the rotation of the input shaft 315 driven by the rotary actuator 313 may be correlated with a predetermined direction and magnitude of the relative rotation, or phase angle, between the first ring gear 200 and the second ring gear 206.

As will be described herein, the planetary actuator 100 may be rotationally coupled between a first rotary component and a second rotary component to selectively impart relative rotation, or a rotational offset, to adjust a phase angle between the first rotary component and the second rotary component. In general, the planetary actuator 100 may be operable in a steady-state mode where the rotational relationship between the first rotary component and the second rotary component is maintained (e.g., locked), and a phasing mode where the rotational relationship between the first rotary component and the second rotary component can be changed (e.g., is unlocked) so that the first rotary component can be rotationally offset in a desired direction and a desired magnitude to be placed at a desired relative rotational position (i.e., phase angle) relative to the second rotary component.

Figure 5:
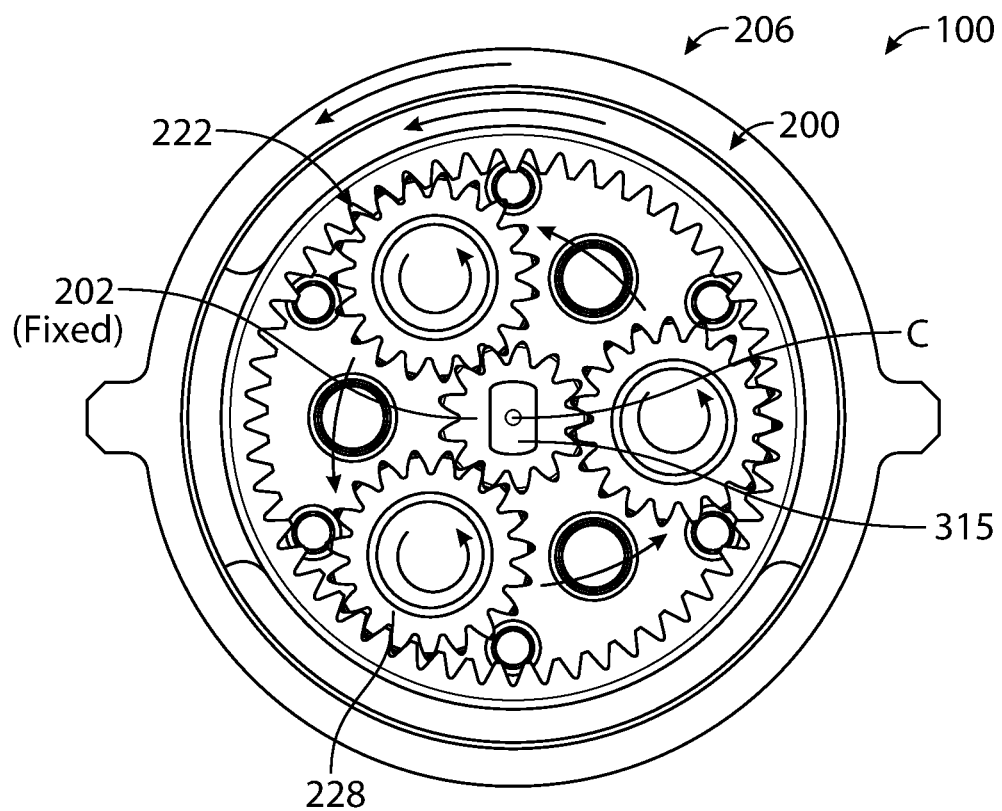
FIG. 5 is a front view of the planetary actuator of FIG. 3 in a steady-state operation mode.

FIG. 5 illustrates the planetary actuator 100 operating in a steady-state mode. As illustrated by the arrows in FIG. 5, the first ring gear 200 and the second ring gear 206 are being rotated in a first direction (e.g., counterclockwise from the perspective of FIG. 5). In the steady-state mode, the input shaft 315 of the rotary actuator 313 (see FIG. 1) may be held rotationally fixed and, thus, the first sun gear 202 may be rotationally fixed due to the rotational coupling between the input shaft 315 and the first sun gear 202. In addition, the second sun gear 208 may be rotationally fixed (e.g., by an anti-rotation ring previously described herein). With the first sun gear 202 and the second sun gear 208 being rotationally fixed, the planet gears 228 of the first set of planet gears 222 may rotate in the first direction, and the planet gears 228 may themselves rotate around the first sun gear 202 in the first direction (e.g., the planet gears 228 may rotate about the central axis, C) due to the rotation of the first ring gear 200. Similarly, the planet gears 236 of the second set of planet gears 224 may rotate around the second sun gear 208 (e.g., in the first direction from the perspective of FIG. 5) due to rotation of the second ring gear 206. As such, the relative rotational orientation between the first ring gear 200 and the second ring gear 206, and thereby between the first rotary component and the second rotary component, may be maintained in the steady-state mode.

In the illustrated non-limiting example, the first ring gear 200 and the second ring gear 206 are being rotated in the first direction, although, it is to be understood that they could also be rotated in a second direction (e.g., clockwise from the perspective of FIG. 5). As such, the planet gears 228 of the first set of planet gears 222 may rotate in the second direction, and the planet gears 228 may themselves rotate around the first sun gear 202 in the second direction (e.g., the planet gears 228 may rotate about the central axis, C) due to the rotation of the first ring gear 200. Similarly, the planet gears 236 of the second set of planet gears 224 may rotate around the second sun gear 208 (e.g., in the second direction from the perspective of FIG. 5) due to rotation of the second ring gear 206. In the illustrated non-limiting example, the first ring gear 200 and the second ring gear 206 are being rotated at the same rotational speed in the steady-state mode.

Figure 6:
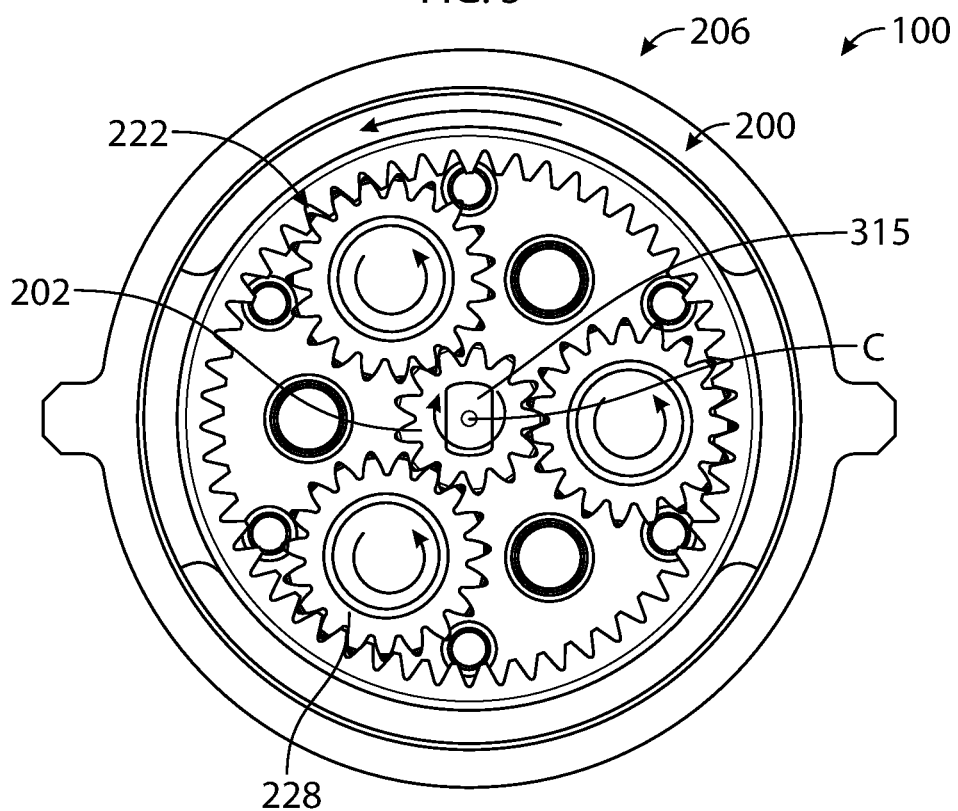
FIG. 6 is a front view of the planetary actuator of FIG. 3 while phasing in a first direction.

FIG. 6 illustrates the planetary actuator 100 operating in the phasing mode where the first ring gear 200 and the second ring gear 206 rotate relative to one another (e.g., to adjust phase angle therebetween to change a compression ratio of an engine), with the phasing occurring in a first phasing direction. As illustrated by the arrows in in FIG. 6, the first ring gear 200 may be selectively rotated relative to the second ring gear 206 in a first direction (e.g., counterclockwise from the perspective of FIG. 6). To facilitate the rotation of the first ring gear 200 relative to the second ring gear 206, the input shaft 315, which is rotationally coupled to be rotated by the rotary actuator 313 (see FIG. 1), may be rotated in a second direction (e.g., clockwise from the perspective of FIG. 6) opposite to the first direction. The rotation of the input shaft 315 in the second direction results in rotation of the first sun gear 202 in the second direction. Rotation of the first sun gear 202 in the second direction results in rotation of the planet gears 228 of the first set of planet gears 222 in the first direction, which rotates the first ring gear 200 in the first direction. With the second sun gear 208 being rotationally fixed, this selective rotation of the first sun gear 202, and thereby the first ring gear 200, allows the first ring gear 200 to rotate relative to the second ring gear 206 in the first direction, causing phasing in the first phasing direction.

Figure 7:
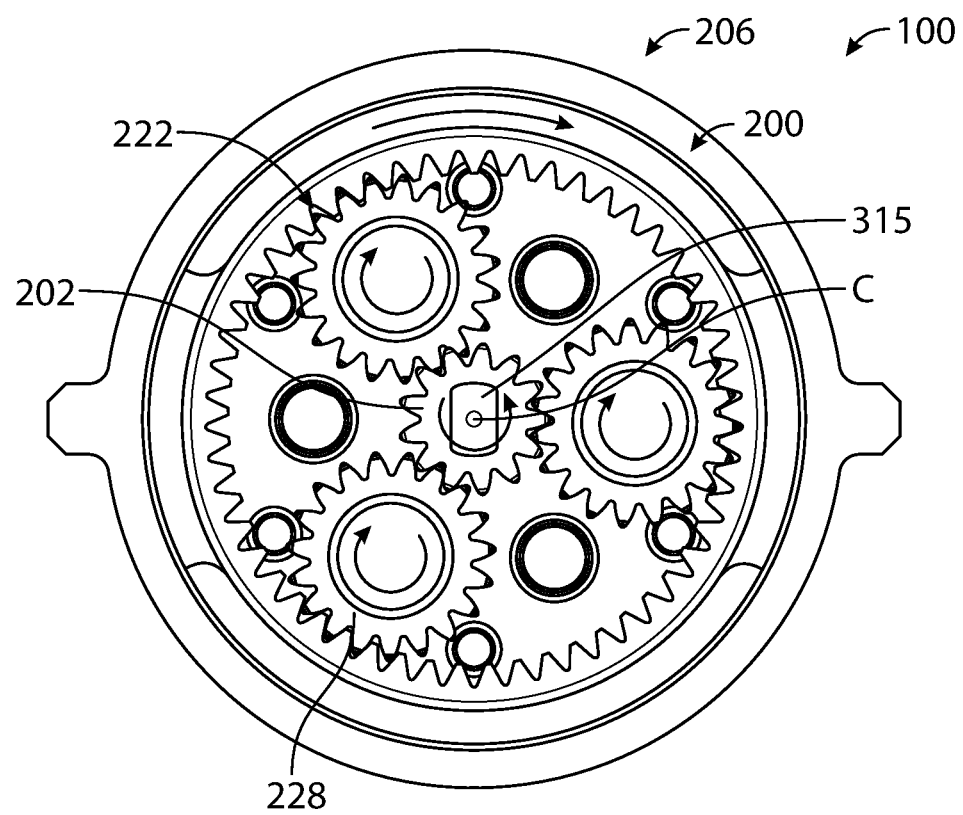
FIG. 7 is a front view of the planetary actuator of FIG. 3 while phasing in a second direction.

FIG. 7 illustrates the planetary actuator 100 operating in the phasing mode, with the phasing occurring in a second phasing direction. As illustrated by the arrows in FIG. 7, the first ring gear 200 may be selectively rotated relative to the second ring gear 206 in a second direction (e.g., clockwise from the perspective of FIG. 7). To facilitate the rotation of the first ring gear 200 relative to the second ring gear 206, the input shaft 315 may be rotated by the rotary actuator 313 (see FIG. 1) in a first direction (e.g., counterclockwise from the perspective of FIG. 7) opposite to the second direction. The rotation of the input shaft 315 in the first direction results in rotation of the first sun gear 202 in the first direction. Rotation of the first sun gear 202 in the first direction results in rotation of the planet gears 228 of the first set of planet gears 222 in the second direction, which rotates the first ring gear 200 in the second direction. With the second sun gear 208 being rotationally fixed, this selective rotation of the first sun gear 202, and thereby the first ring gear 200, allows the first ring gear 200 to rotate relative to the second ring gear 206 in the second direction, causing phasing in the first phasing direction.

As described herein, the amount of relative rotation between the first ring gear 200 and the second ring gear 206 may be determined by the known gear ratio between the input shaft 315 and the first ring gear 200. It should be appreciated that FIGS. 6-7 are illustrating the relative rotation between the first ring gear 200 and the second ring gear 206, but in application, the first ring gear 200 and the second ring gear 206 may, themselves, be rotating while the phasing, or while relative rotation is occurring. Further, the design of the planetary actuator 100 allows for full three-hundred and sixty degree relative rotation between the first ring gear 200 (and any other rotary component rotationally coupled thereto) and the second ring gear 206 (and any other rotary component rotationally coupled thereto).

In general, the design and implementation of the planetary actuator 100 only requires an input signal (i.e., the input torque/speed/displacement provided from to the input shaft 315 of the rotary actuator 313, and thereby to the first sun gear 202) to rotate when relative rotation (i.e., phasing) is desired. This is different from conventional phasing systems, which generally require the input shaft 315 to be constantly rotating with either the first ring gear 200 and/or the second ring gear 206, even when not providing an input signal (e.g., during steady-state operation). As a result, the mechanical phasing assembly 300 can achieve improved longevity over conventional phasing systems.

For example, during steady-state operation of the mechanical phasing assembly 300, when no relative rotation is desired, the input shaft 315 may be rotationally fixed (e.g., stationary). Additionally, during a phasing operation (i.e., when relative rotation is desired), the input shaft 315 is not required to rotate at the same speed as either the first ring gear 200 or the second ring gear 206. For example, the input shaft 315, and thereby the first sun gear 202, may only be required to rotate at the rate of change of the desired phase angle (e.g., a phasing speed configured to achieve the desired phase angle). In this way, for example, the rotation (i.e., speed/displacement) of the input shaft 315 in the phasing mode may be proportional to a magnitude of the relative rotation desired between the first ring gear 200 and the second ring gear 206. As such, a power and speed required to rotate the input shaft 315 to achieve the desired relative rotation may be independent of a speed of the first ring gear 200 and/or the second ring gear 206. In addition, in the non-limiting examples, where a gear reduction exists between the input shaft 315 and the second ring gear 206, the gear reduction may reduce an amount of torque required to achieve the desired relative rotation.

Figure 8:
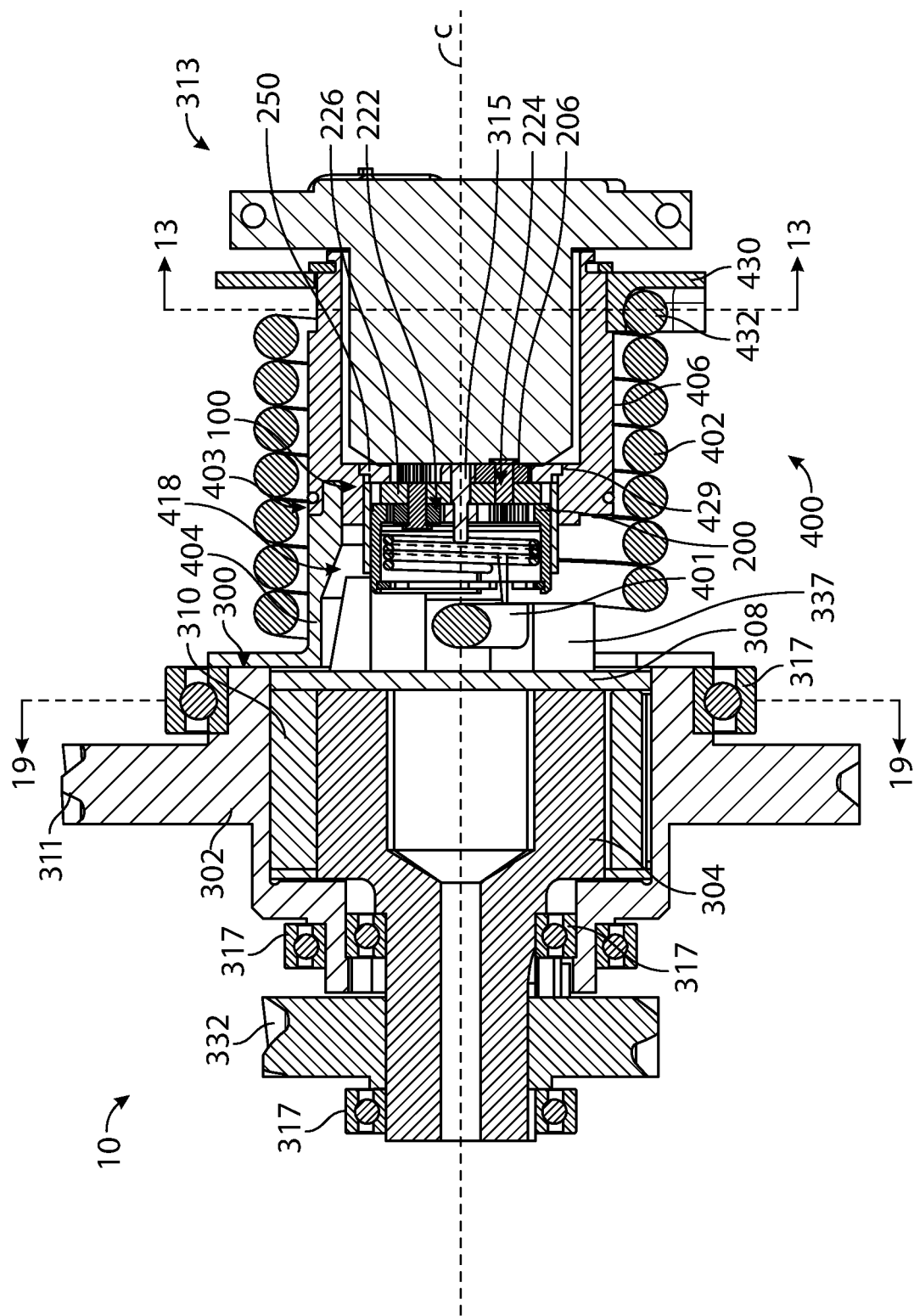
FIG. 8 is a cross-sectional view of the rotational phasing system of FIG. 1.
Figure 9:
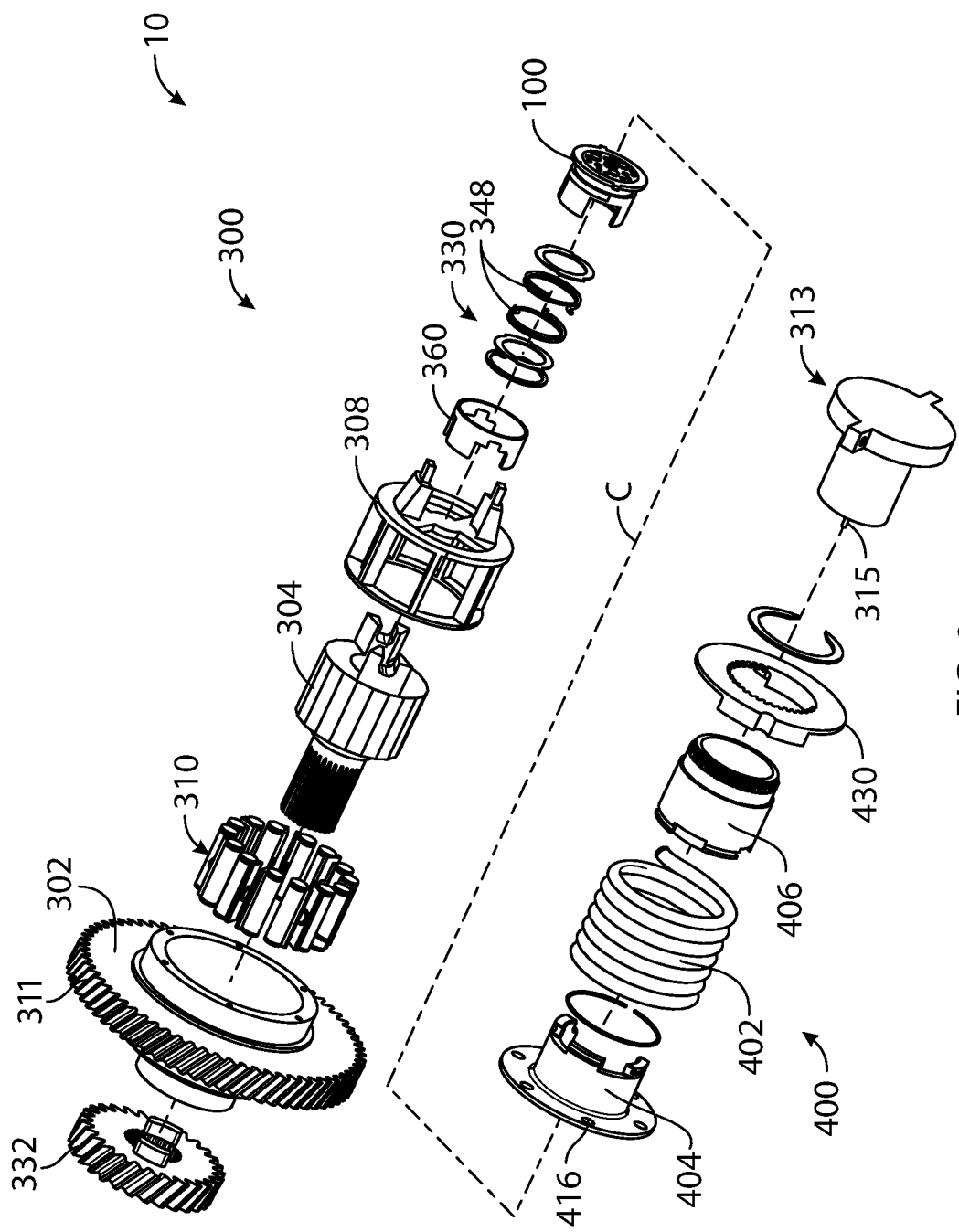
FIG. 9 is an exploded view of the rotational phasing system of FIG. 8.

In general, the planetary actuator 100 may be utilized in rotary system where selective, controllable relative rotation is desired. For example, the planetary actuator 100 may be implemented in mechanical phasing assemblies. FIGS. 8-9 illustrate one non-limiting example of a rotational phasing system 10 with the planetary actuator 100 installed in a mechanical phasing assembly 300. In the illustrated non-limiting example, the mechanical phasing assembly 300 may include a gear hub 302 (e.g., a first rotary component), a cradle rotor 304 (e.g., a second rotary component), a spider rotor 308 (e.g., a bearing cage), a plurality of locking assemblies 310, the planetary actuator 100, and a torsion spring assembly 400. The planetary actuator 100, the torsion spring assembly 400, the gear hub 302, the cradle rotor 304, the spider rotor 308, and the plurality of locking assemblies 310 can each share a common central axis C, when assembled. As will be described herein, the torsion spring assembly 400 can be configured to apply a torque load between the cradle rotor 304 and the gear hub 302. The torsion spring assembly 400 can include a torsion spring 402, and a spring sleeve 403. In the illustrated non-limiting example, the spring sleeve 403 is configured as a two-piece spring sleeve including a first spring sleeve 404 and a second spring sleeve 406 but may also be configured a single piece spring sleeve or a multi-piece spring sleeve having more than two pieces. As will be described herein, the torsion spring assembly 400 can be configured to rotationally fix the second ring gear 206 to the gear hub 302. The torsion spring assembly can also be configured to attach an end of the torsion spring 402 to the gear hub 302.

In the illustrated non-limiting example, the spider rotor 308 (including the plurality of locking assemblies 310) can be arranged radially between the cradle rotor and the gear hub. The spring sleeve 403 of the torsion spring assembly can be coupled to the gear hub 302 and extend axially away therefrom. In the illustrated example, a coil portion of the torsion spring 402 can circumferentially extend around an outside of the spring sleeve 403. As illustrated, the spring sleeve 403 can define an interior cavity 418 (see also FIG. 11) and the planetary actuator 100 can be received within the interior cavity 418. According to the illustrated non-limiting example, at least a portion of the rotary actuator 313 can also be received within the interior cavity 418 of the spring sleeve 403.

In the illustrated non-limiting example, the mechanical phasing assembly 300 may include a rotary actuator 313. In some non-limiting examples, the rotary actuator 313 may include a stator and a rotor that is electromagnetically coupled to the stator (not shown). A current may be applied to the rotary actuator 313 that may result in a rotary output at the input shaft 315 being provided by the rotary actuator 313 in a desired direction at a desired force. In some non-limiting examples, the rotary actuator 313 may be in the form of a brushless DC (BLDC) motor. In the illustrated non-limiting example, the mechanical phasing assembly 300 can include one or more bearings 317 configured to rotationally support internal components of the mechanical phasing assembly, or rotationally support the mechanical phasing assembly 300 relative to a component of an engine, for example, via structures or brackets included in or formed as a part of an engine block, or other engine component. In the illustrated non-limiting example, a bearing 317 is arranged between the gear hub 302 and the cradle rotor 304, and along a shaft extending from the cradle rotor. Additional bearings 317 are arranged along the outside of the gear hub 302.

Figure 10:
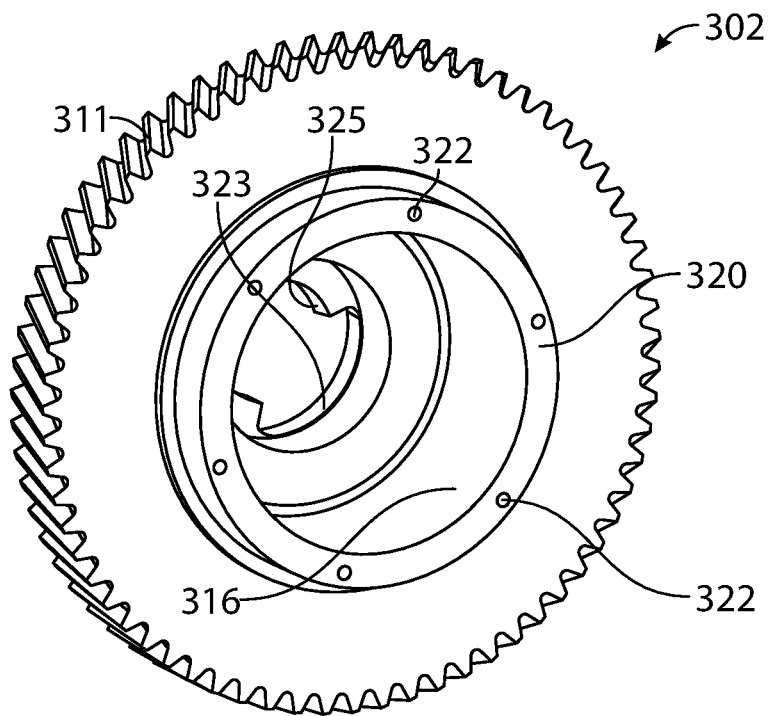
FIG. 10 is a perspective view of a gear hub of the rotational phasing system of FIG. 8.
Figure 11:
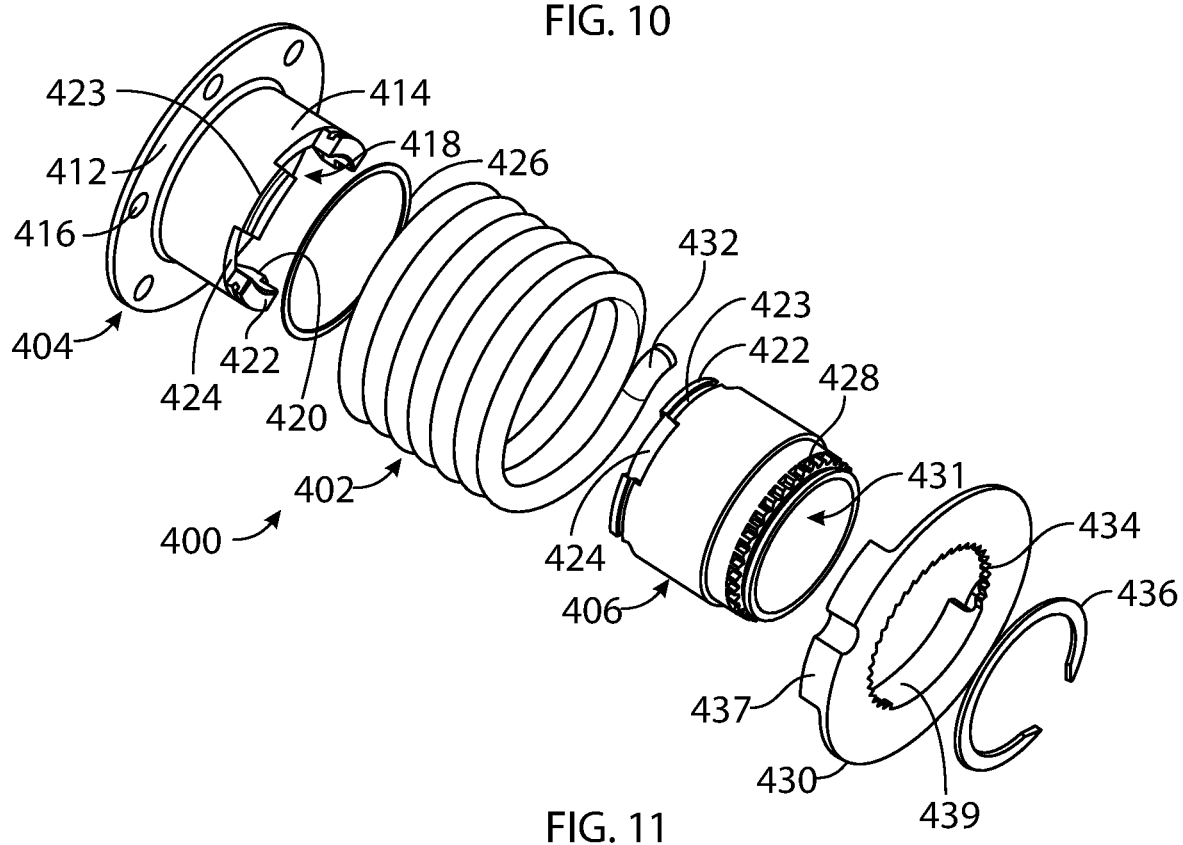
FIG. 11 is an exploded view of a torsion spring assembly of the rotational phasing system of FIG. 8.

With specific reference to FIGS. 9-11, the gear hub 302 can include a first gear 311 arranged on an outer diameter thereof, which can be in rotational communication with (e.g., coupled to) a crank shaft 12 (see FIG. 1) of an internal combustion engine, for example, via a belt, chain, or gear train assembly. The gear hub 302 can include an inner surface 316 and a front surface 320. The front surface 320 of the gear hub 302 can include a plurality of apertures 322 configured to receive a fastening element to fixedly attach, for example, the spring sleeve 403 (e.g., the first spring sleeve 404) to the gear hub 302 for rotation therewith. In some non-limiting examples, the gear hub 302 may define a plurality of circumferential slots (not shown) that are recessed axially and configured to receive radial protrusions (not shown), which protrude from an outer periphery of the first spring sleeve. In any case, the first spring sleeve 404 may be coupled to the gear hub 302, such that the first spring sleeve 404 rotates with the gear hub 302 (e.g., rotationally fixed). The gear hub 302 may also include arcuate recesses 323 that extend radially outward from a shaft portion 325 (see FIG. 10).

With specific reference to FIGS. 9 and 11, the first spring sleeve 404 can include a flange 412 and an annular protrusion 414. As noted above, the flange 412 can include a plurality of apertures 416. Each of the plurality of apertures 416 may be arranged to align with a corresponding aperture 322 on the front surface 320 of the gear hub 302. The annular protrusion 414 can extend axially away from the flange 412 to define an interior cavity 418. The interior cavity 418 may be dimensioned to axially receive at least a portion of the planetary actuator 100 therein. The interior cavity 418 can have a cutout 420 (see FIG. 11) extending axially along the interior cavity 418, thereby creating an opening along the length of the interior cavity 418. The cutout 420 is configured to receive a first coil end (see FIG. 8) of the torsion spring 402 therethrough.

The first spring sleeve 404 and the second spring sleeve 406 can include a castellated feature at an axial end thereof. The castellated feature can include a plurality of axial protrusions 422 and a plurality of axial recesses 424. The axial protrusions 422 of the first spring sleeve 404 are configured to engage with the axial recesses 424 of the second spring sleeve 406 to rotationally lock the first spring sleeve 404 to the second spring sleeve 406 for rotation therewith. Similarly, the axial protrusions 422 of the second spring sleeve 406 are configured to engage with the axial recesses 424 of the first spring sleeve 404. When assembled, a snap ring 426 can be received within a snap ring groove 423 on the axial protrusions 422 on each of the first spring sleeve 404 and the second spring sleeve 406 to couple the first spring sleeve 404 to the second spring sleeve 406. The second spring sleeve 406 can include a plurality of first slots 428 configured as splines at an axial end opposite the castellated feature. The second spring sleeve 406 can also include tab recess 429 (see FIG. 8) within an interior cavity 431 of the second spring sleeve. The tab recesses 429 are configured to receive the tabs 250 of the second ring gear 206 (see FIG. 8) such that the second ring gear 206 is rotationally fixed with the second spring sleeve 406, thereby rotationally fixing the second ring gear 206 to the first spring sleeve 404 and the gear hub 302 for rotation therewith.

Figure 12:
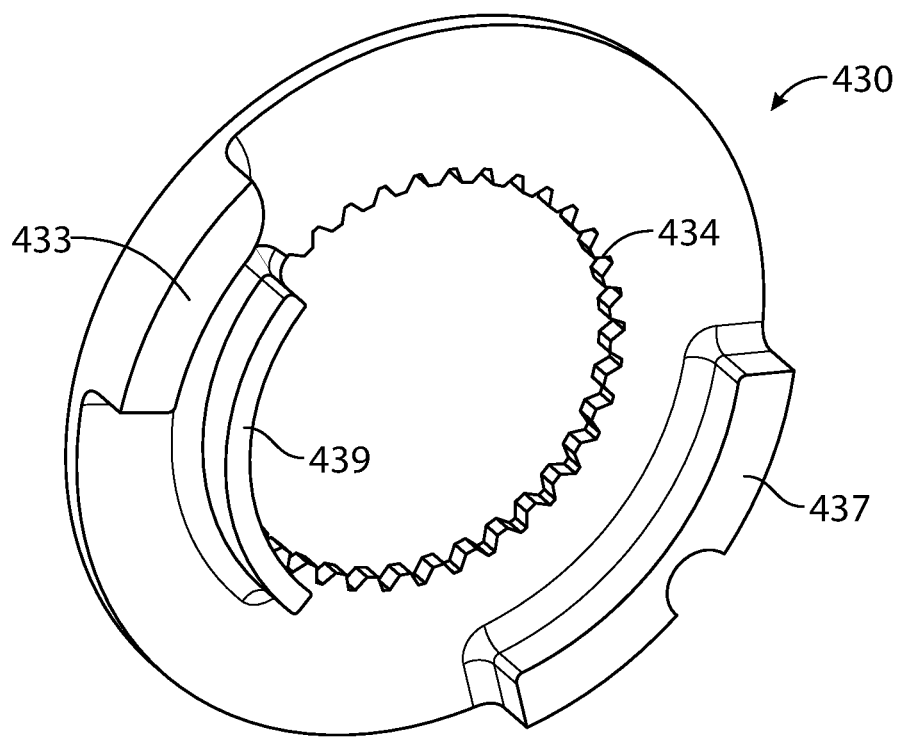
FIG. 12 is a perspective view of a spring seat of the torsion spring assembly of FIG. 11.
Figure 13:
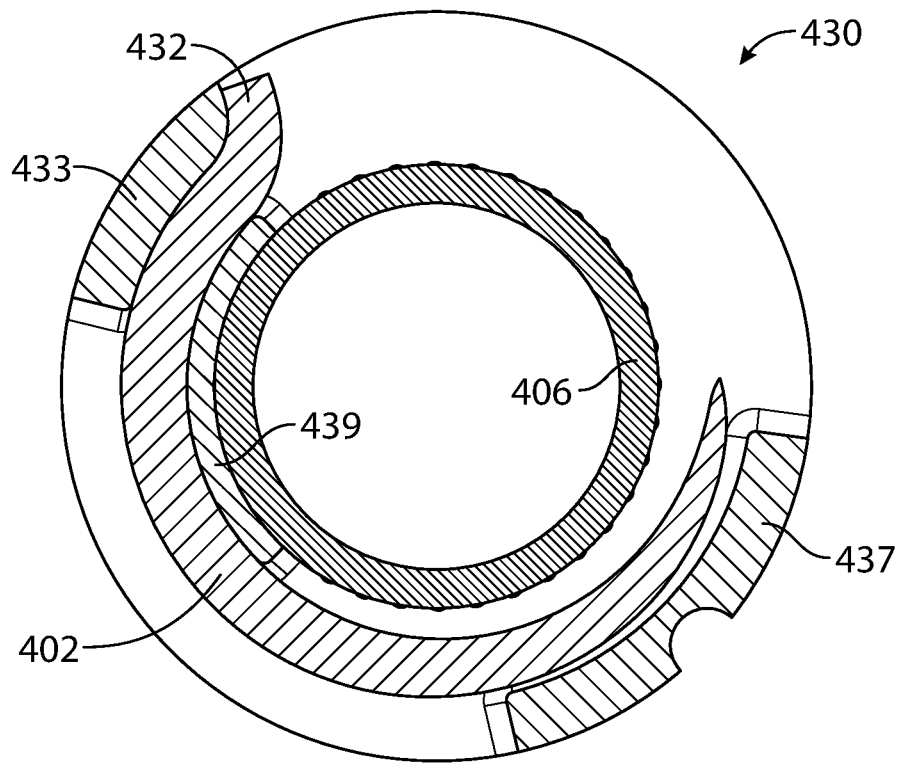
FIG. 13 is a cross-section view of the torsion spring assembly of FIG. 11 taken along line 13-13 (see FIG. 8).

Referring to FIGS. 11-13, the torsion spring assembly 400 can also include a spring seat 430 coupled to the spring sleeve 403 (e.g., to the second spring sleeve 406). The spring seat 430 can be configured to secure and engage a second coil end 432 of the torsion spring 402. For example, the spring seat 430 can include a first spring support 433 (see FIGS. 12 and 13) protruding axially away from the spring seat 430 towards the flange 412 of the first spring sleeve 404. The first spring support is also arranged radially outward from the torsion spring 402. The first spring support 433 is configured to engage the second coil end 432 of the torsion spring 402 and prevent the torsion spring 402 from uncoiling towards an unloaded state (e.g., unbiased or without preload). The spring seat 430 can also include second and third spring supports 437, 439. In the illustrated non-limiting example, the second and third spring supports 437, 439 protrude axially away from the spring seat 430 towards the flange 412 of the first spring sleeve 404. The second spring support 437 is arranged radially outward from the torsion spring 402 to support an outside of the coil portion of the torsion spring 402. The third spring support 439 is arranged radially inward from the torsion spring 402 to support an inside of the coil portion of the torsion spring 402.

In the illustrated non-limiting example, the first, second, and third spring supports 433, 437, and 439 extend circumferentially along the spring seat 430 to form arcuately-shaped protrusions that define radii of curvature that share the same center as the radius of curvature defined by the coil portion of the torsion spring 402. That is, the arcuate-shaped protrusions formed by the first, second, and third spring supports 433, 437, 439 are concentric to the circular profile of the coil portion of the torsion spring 402. Together the first, second, and third spring supports 433, 437, 439 can be configured to prevent stress risers in the torsion spring 402 and prevent side loading between components mated to the torsion spring 402. For example, the first, second, and third spring supports 433, 437, 439 can engage inner and outer parts of the torsion spring 402 to prevent side loading.

As illustrated in FIGS. 11 and 12, the spring seat 430 can include a plurality of second slots 434 configured as splines that are complementary to the first slots 428 of the second spring sleeve 406 so that the spring seat 430 can be rotationally fixed to the second spring sleeve for rotation therewith. When assembled, a snap ring 436 can be received within a snap ring groove adjacent to the first slots 428 of the second spring sleeve 406 to prevent axial displacement of the spring seat 430 relative to the second spring sleeve 406.

As previously described herein, the first coil end 401 of the torsion spring 402 can be coupled to the cradle rotor 304 and the second coil end 432 of the torsion spring can be coupled to the spring seat 430, and thereby the gear hub 302 via the first and second spring sleeves 404, 406. In this configuration, a torque load can be applied by the torsion spring 402 between the gear hub 302 and the cradle rotor 304.

Figure 14:
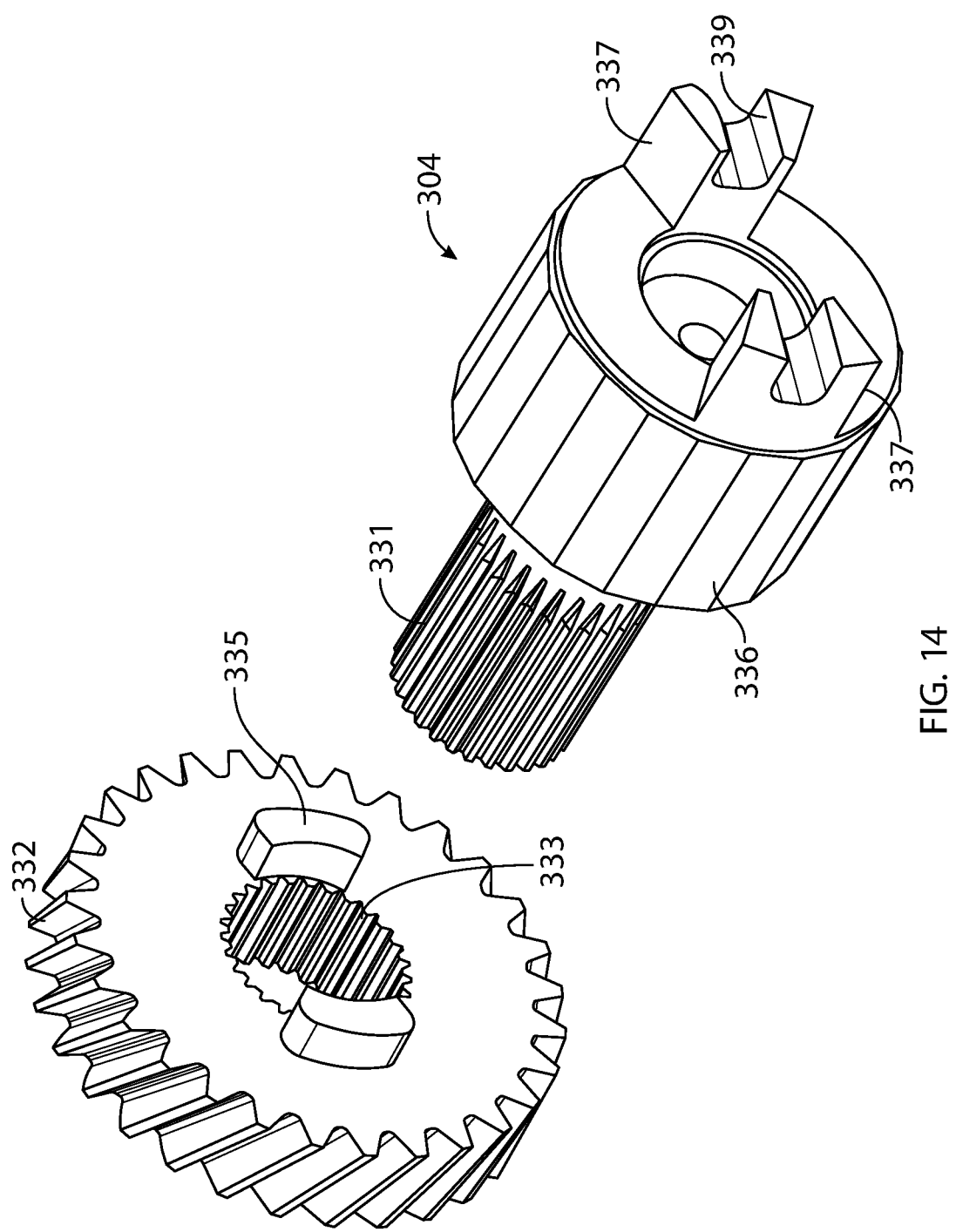
FIG. 14 is an exploded view of a cradle rotor of the rotational phasing system of FIG. 8.

Referring now to FIG. 14, the cradle rotor 304 may be configured to be in rotational communication with (e.g., coupled to) the eccentric shaft 14 (see FIG. 1) of an internal combustion engine via a second gear 332. The cradle rotor 304 includes a splined shaft 331 extending axially away from an end of the cradle rotor 304. The second gear 332 includes a splined recess 333, which is complementarily shaped to the splined shaft 331 and is configured to receive the splined shaft 331 therein for coupling to the second gear 332. In the illustrated non-limiting example, the second gear 332 may be rotationally fixed to the cradle rotor 304 for rotation therewith. The cradle rotor 304 can also include at least one axial protrusion 337 configured to receive and engage an end of the torsion spring 402. In the illustrated non-limiting example, the cradle rotor 304 includes two axial protrusions 337 extending axially away from an end that is opposite the splined shaft 331. In the illustrated non-limiting example, the axial protrusions 337 extend into the interior cavity 418 formed by the spring sleeve 403 to engage the torsion spring 402 (see FIG. 8). The axial protrusions 337 are equally spaced circumferentially around the cradle rotor 304 (e.g., circumferentially spaced apart by 180 degrees). In other non-limiting examples, the cradle rotor 304 may include more or less than two axial protrusions 337 arranged circumferentially around the cradle rotor. Each of the axial protrusions 337 include a spring recess 339 extending axially into the axial protrusions 337. The spring recesses 339 are configured to receive the first coil end 401 (see FIG. 8) of the torsion spring 402 therein such that the torsion spring 402 can apply a torque to the cradle rotor 304.

With continued reference to FIG. 14, the second gear 332 can include (arcuate) protrusions 335 that extend axially away from the second gear 332. The number of protrusions 335 may correspond with a number of (arcuate recesses) 323 in the gear hub 302 (see FIG. 10). When assembled (see FIG. 8), the splined shaft 331 of the cradle rotor 304 can be received within the shaft portion 325 of the gear hub 302 and extend therethrough. The second gear 332 can then be installed on the splined shaft 331 such that the arcuate protrusions 335 of the second gear 332 are received within the arcuate recesses 323 of the gear hub 302. The arcuate protrusions 335 of the second gear 332 coupled to the cradle rotor 304 can engage ends of the arcuate recesses 323 in the gear hub 302 to mechanically limit the overall relative rotation between the cradle rotor 304 (in rotational communication with the eccentric shaft 14) and the gear hub 302 (in rotational communication with the crank shaft 12, see FIG. 1). This can mechanically limit how much relative rotation can exist between the eccentric shaft and the crank shaft as the ends of the arcuate recesses 323 in the gear hub 302 can act as rotational end stops for the arcuate protrusions on the second gear 332 coupled to the cradle rotor 304. Accordingly, in cases where the mechanical phasing assembly 300 fails, or if the rotary actuator fails, the rotational phasing system 10, and thereby the internal combustion engine, can be protected from damage.

With additional reference to FIG. 9, in general, an outer surface 336 of the cradle rotor 304 may be in engagement with the locking assemblies 310. It should be appreciated that alternative configurations for the relative coupling of the gear hub 302, the cradle rotor 304, the eccentric shaft 14, and the crank shaft 12 are possible.

Figure 15:
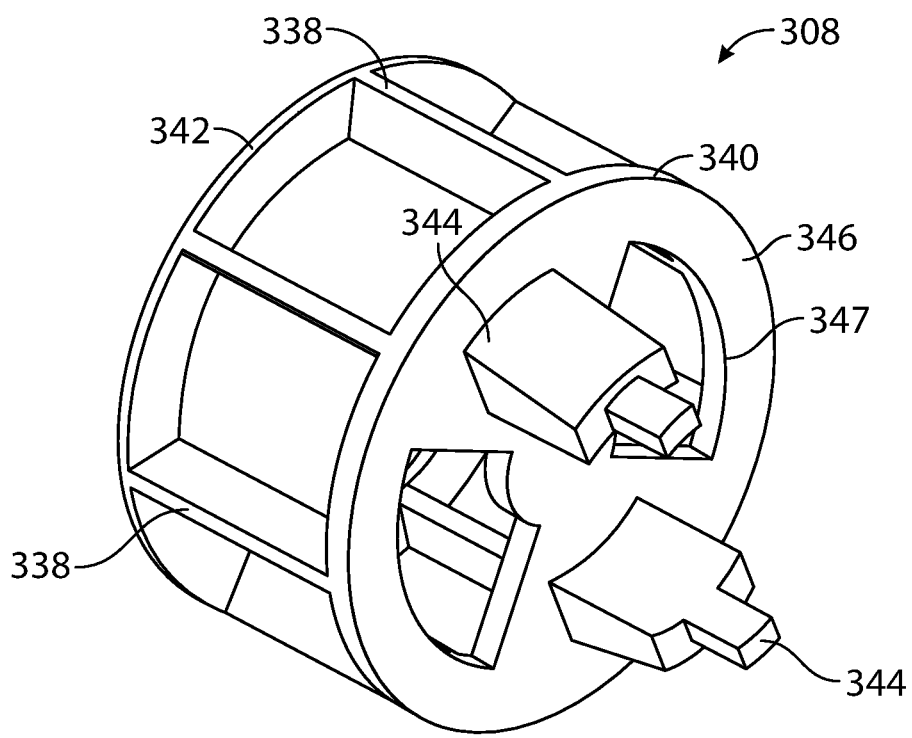
FIG. 15 is a perspective view of a spider rotor of the rotational phasing system of FIG. 8.
Figure 16:
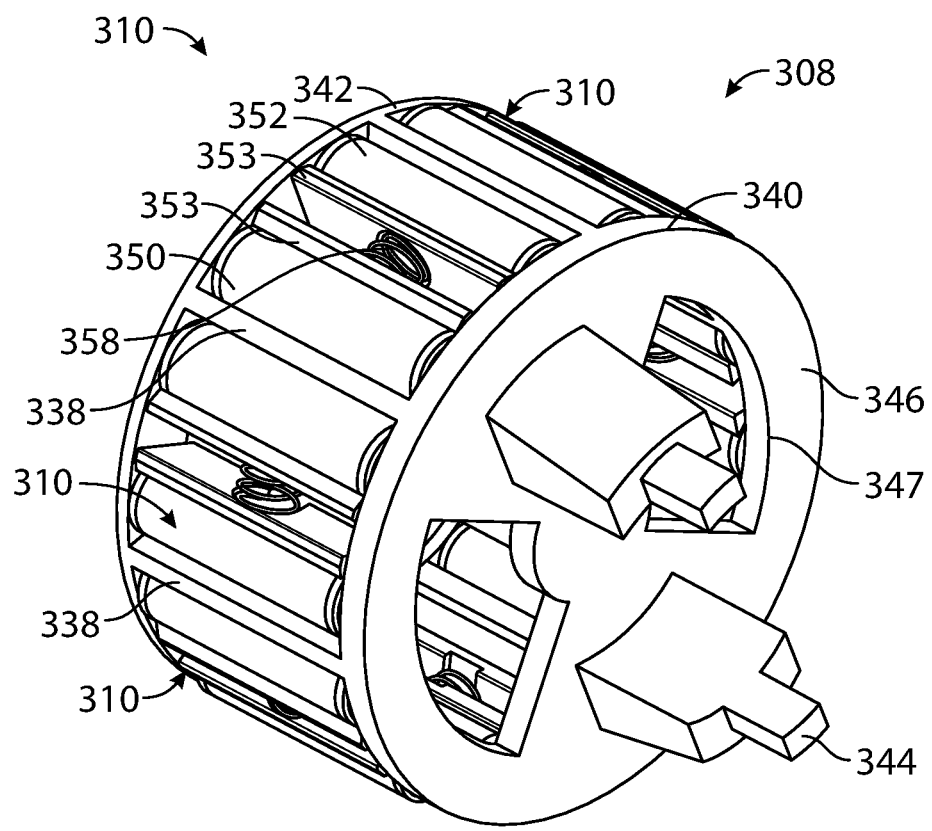
FIG. 16 is a perspective view of the spider rotor of FIG. 15 with a plurality of locking assemblies installed therein.

As illustrated in FIGS. 15-16, the spider rotor 308 may include a plurality of arms 338 that extend axially between a first cage ring 340 and a second cage ring 342. One of the plurality of locking assemblies 310 may be arranged circumferentially between each circumferentially adjacent pair of the arms 338. The spider rotor 308 may include a plurality of axial protrusions 344 extending axially away from a first surface 346 thereof. The number of axial protrusions 344 may correspond with a number of slots in a coupling ring 360 (see FIG. 17) arranged between the spider rotor 308 and the first ring gear 200 of the planetary actuator 100. In the illustrated non-limiting example, the spider rotor 308 includes two axial protrusions 344. In other non-limiting examples, the spider rotor 308 may include more or less than two protrusions 344. The spider rotor 308 can also include openings 347 extending through the first surface 346. The openings 347 are configured to receive the axial protrusions 337 extending from the cradle rotor 304.

Each locking assembly 310 can include a first locking feature 350, a second locking feature 352, and corresponding locking feature supports 353 in engagement with each one of the first and second locking features 350 and 352. The first locking feature 350 and the second locking feature 352 can be forced away from each other by one or more biasing members 358. The biasing members 358 can be arranged between and in engagement with corresponding pairs of the locking feature supports 353 thereby forcing the first and second locking features 350 and 352 away from each other. Each illustrated locking assembly 310 can include one biasing member 358 in the form of a spring. In other embodiments, at least one of the locking assemblies 310 may include more than one biasing member 358. The biasing members 358 may be in the form of any viable resilient element (e.g., spring, rubber bushing, etc.) or mechanical linkage capable of forcing the first locking feature 350 and the second locking feature 352 away from each other.

In the illustrated non-limiting example, the first and second locking features 350 and 352 can be in the form of round bearing rollers. It should be appreciated that the first and second locking features 350 and 352 may define any shape that enables selective locking and unlocking between the gear hub 302 and the cradle rotor 304. It should also be appreciated that alternative mechanisms are possible for the first and second locking features 350 and 352 other than a bearing. For example, the first and second locking features 350 and 352 may be in the form of wedged features.

Figure 17:
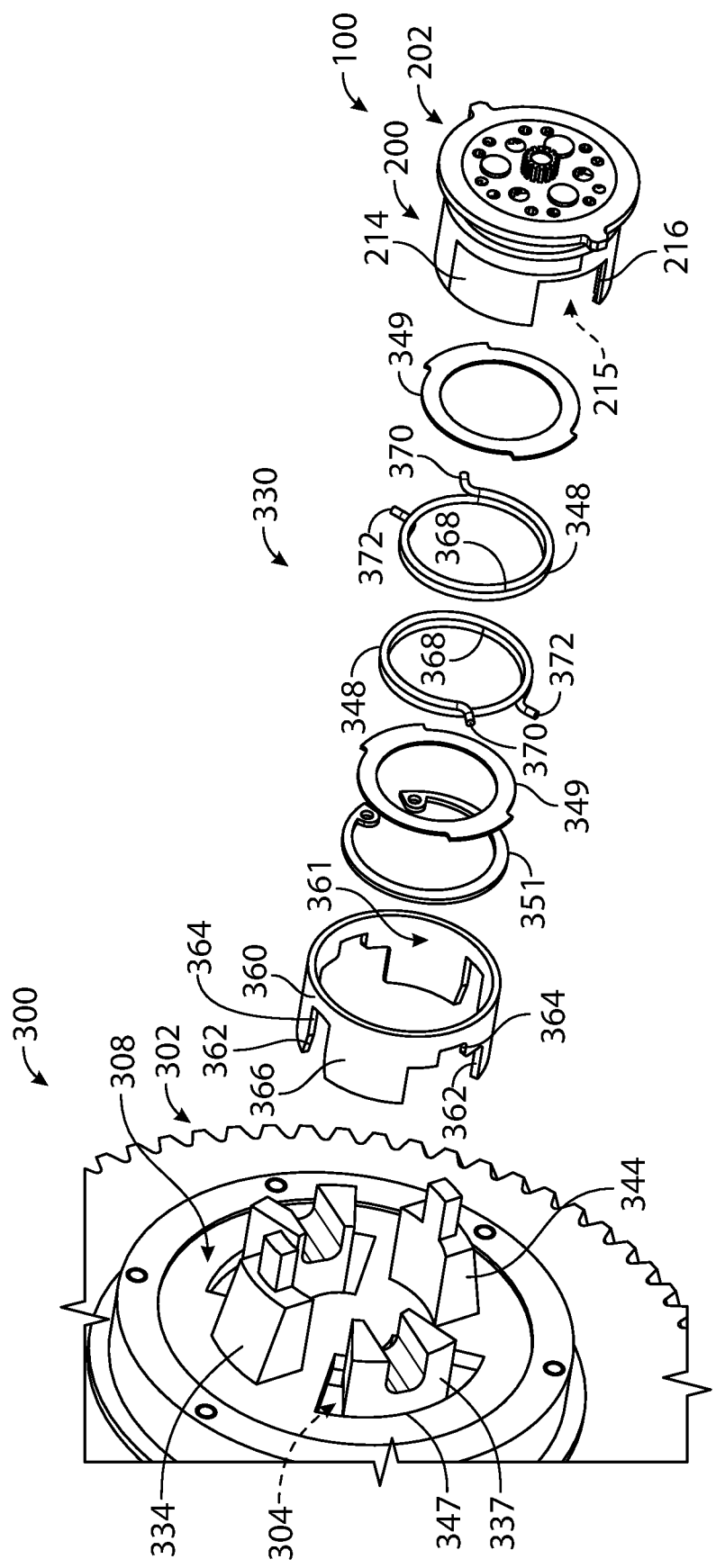
FIG. 17 is an exploded view of a coupling assembly of the rotational phasing system of FIG. 8.
Figure 18:
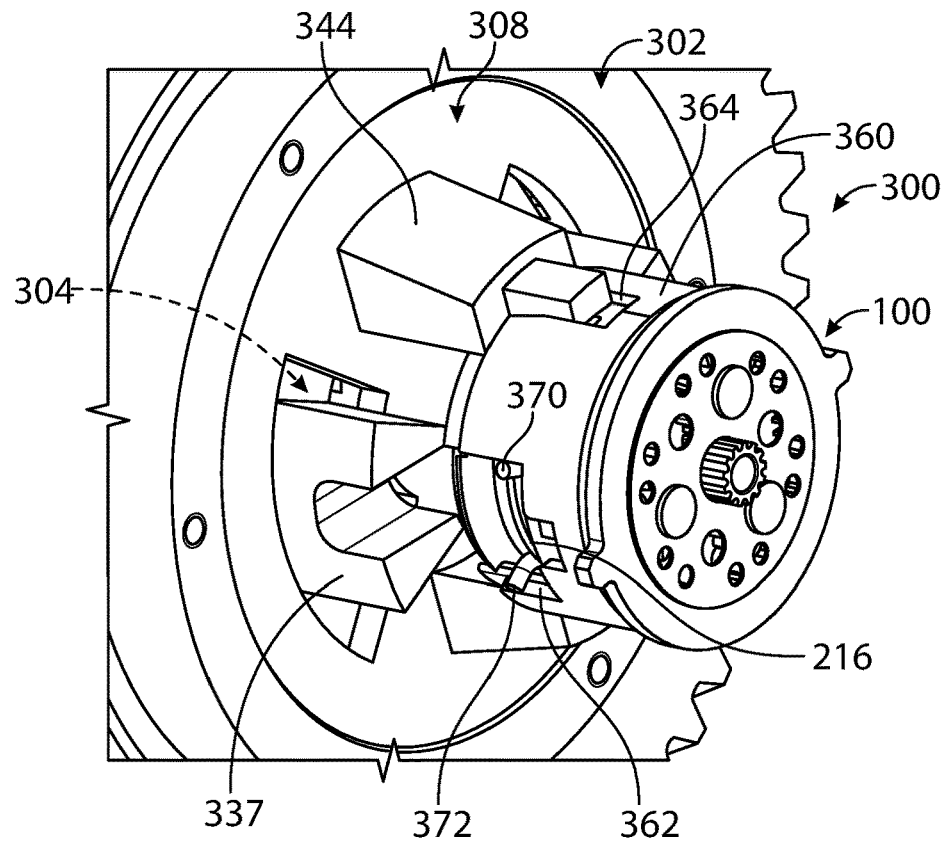
FIG. 18 is a perspective view of the coupling assembly of FIG. 17 installed between the planetary actuator and the mechanical phasing assembly of FIG. 8.

With specific reference to FIGS. 9 and 17-18, a coupling assembly 330 can be arranged between the mechanical phasing assembly 300 and the planetary actuator 100. The coupling assembly 330 can include the coupling ring 360, one or more compliance members 348, one or more washers 349, and a snap ring 351. When assembled (see FIG. 18), the compliance members 348 and the washers 349 are received within the cavity 215 of the first ring gear 200. The compliance members 348 and the washers 349 are secured within the cavity 215 of the first ring gear 200 by the snap ring 351 to prevent axial displacement of the compliance members relative to the first ring gear 200. The snap ring 351 can be secured to the first ring gear 200 via insertion into the snap ring groove 218 along the inside of the cavity 215 (see FIGS. 2 and 3). The coupling ring 360 is dimensioned such that the first ring gear 200 can be received therein.

In the illustrated non-limiting example, the compliance members 348 may be coupled between the first ring gear 200 and the coupling ring 360, such that rotation of the first ring gear 200 is rotationally transferred to the coupling ring 360. The coupling ring 360 can be configured to transfer the rotation from the first ring gear 200 to the spider rotor 308. As will be described below, the transfer of rotation between the first ring gear 200 and the coupling ring 360 can be provided by the compliance members 348, while also allowing the rotary actuator 313 (see FIG. 8) to provide input to the planetary actuator 100 when the mechanical phasing assembly 300 is in a locked state.

The coupling ring 360 can define an annular-shaped sleeve with a hollow core 361. The coupling ring 360 can include a first set of axially recessed slots 362 and a second set of axially recessed slots 364. The number of the first set of slots 362 may correspond with a number of slots 216 in the first ring gear 200. In the illustrated non-limiting example, the first set of slots 362 includes two slots equally spaced circumferentially around an outer surface 366 of the coupling ring 360 (e.g., circumferentially spaced apart by 180°). In other non-limiting examples, the first set of slots 362 may include more or less than two slots 362 arranged in any increments circumferentially around the outer surface 366 of the coupling ring 360 such that the slots 362 are in circumferential alignment with the slots 216 on the first ring gear 200.

When assembled (see FIG. 18), coil portions 368 of the compliance members 348 can be received within the cavity 215 of the first ring gear 200. First and second ends 370, 372 of the compliance members 348 can protrude radially outward from the coil portion 368 and extend through the slots 216 in the first ring gear 200 and the first set of slots 362 in the coupling ring 360. In some non-limiting examples, the compliance members 348 may be pre-biased (e.g., pre-loaded) such that the first and second ends 370, 372 thereof extend circumferentially away from one another in a free state. For example, first and second ends 370, 372 of the compliance members 348 may be pre-biased to extend away from one another to form a circumferential separation therebetween that is larger in a free state when compared to an assembled or compressed state.

When assembled (see FIG. 18), and during steady-state operation when no relative rotation is desired, the first and second ends 370, 372 of the compliance members 348 are in engagement with the edges of the slots 216 in the first ring gear 200 and the edges of the first set of slots 362 in the coupling ring 360 to maintain a rotational alignment between the first ring gear 200 and the coupling ring 360. In the illustrated non-limiting example, the edges of the slots 216 in the first ring gear 200 and the edges of the first set of slots 362 in the coupling ring 360 can define the same circumferential separation such that the opening formed by the first set of slots 362 and the slots 216 are approximately the same circumferential width.

With continued reference to FIGS. 17-18, the number of the second set of slots 364 may correspond with a number of axial protrusions 344 in the spider rotor 308. In the illustrated non-limiting example, the second set of slots 364 includes two slots equally spaced circumferentially around the outer surface 366 of the coupling ring 360 (e.g., circumferentially spaced apart by) 180°. In other non-limiting examples, the second set of slots 364 may include more or less than two slots 364 arranged in any increments circumferentially around the outer surface 366 of the coupling ring 360 such that the slots 364 are in circumferential alignment with the axial protrusions 344 in the spider rotor 308.

When assembled (see FIG. 18), the axial protrusions 344 in the spider rotor 308 are in engagement with the second set of slots 364 in the coupling ring 360 to maintain a rotational alignment between the spider rotor 308 and the coupling ring 360. That is, the coupling ring 360 and the spider rotor 308 can be rotationally locked with one another. In the illustrated non-limiting example, the axial protrusions 344 are complementarily shaped to the second set of slots 364 in the coupling ring 360. With specific reference to FIG. 18, with the coupling assembly 330 arranged between the mechanical phasing assembly 300 and the planetary actuator 100, the first ring gear 200 can be rotationally coupled to the coupling ring 360 via the compliance members 348, and the coupling ring 360 can be rotationally coupled to the spider rotor 308, but the first ring gear 200 may not be in direct contact with the spider rotor 308. Thus, due to the compliance members 348, a rotational or angular displacement between the spider rotor 308 and the first ring gear 200 can be enabled by the rotary actuator 313 driving the planetary actuator 100.

Figure 19:
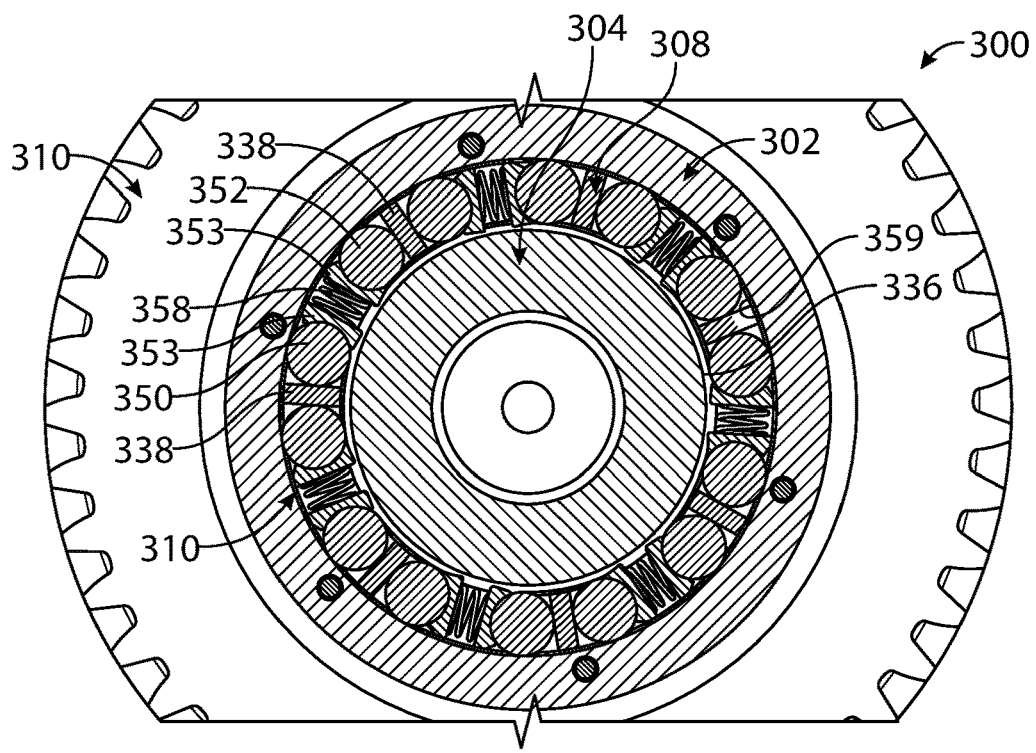
FIG. 19 is a cross-section view of the mechanical phasing assembly of FIG. 8 taken along line 19-19.

With reference to FIGS. 18-19, when the planetary actuator 100 is installed onto the spider rotor 308, the ends 370, 372 of each compliance member 348 extend radially outward and engage a corresponding one of the recessed slots 216 formed in the first ring gear 200 and the first set of slots 362 formed in the coupling ring 360. With the compliance members 348 installed, the recessed slots 216 of the first ring gear 200 and the first set of slots 362 of the coupling ring 360 may each define a circumferential width to ensure that the ends 370, 372 of the compliance members 348 are biased toward one another, relative to the free state thereof. Thus, the pre-bias of the compliance members 348 may ensure that a force, that results from relative rotation between the first ring gear 200 and the spider rotor 308, is maintained on the spider rotor 308 until the spider rotor 308 is rotationally aligned with the first ring gear 200 (i.e., not rotated relative thereto).

The rotary actuator 313 may be rotationally coupled to the first sun gear 202 and control the rotation thereof, which in turn, controls the rotation of the first ring gear 200. In general, the second ring gear 206 may be configured to be rotationally coupled to the gear hub 302, through the spring sleeve 403 of the torsion spring assembly 400, such that the second ring gear 206 rotates with the gear hub 302. In the illustrated non-limiting example, the second ring gear 206 may be fixed to the second spring sleeve 406, which is rotationally coupled to the gear hub 302 via the first spring sleeve 404 for rotation therewith.

In operation, the rotary actuator 313 may be configured to apply the rotary displacement/torque to the first sun gear 202 to achieve a known rotary displacement of the first ring gear 200, which corresponds with a known desired rotational displacement of the spider rotor 308. The rotary actuator 313 can be controlled and powered by the engine control module (ECM) of the internal combustion engine.

During operation, the gear hub 302 can be coupled to the crank shaft 12 of the VCR internal combustion engine. The eccentric shaft 14 in the VCR internal combustion engine can be coupled to the cradle rotor 304. Thus, the eccentric shaft 14 and the crank shaft 12 can be coupled to rotate together, with the eccentric shaft 14 rotating half as fast as the crank shaft 12, via the mechanical phasing assembly 300. The eccentric shaft 14 may be configured to vary a compression ratio of the internal combustion engine during engine operation. During engine operation, the mechanical phasing assembly 300 may be used to alter the rotational relationship of the eccentric shaft 14 relative to the crank shaft 12, which, in turn, alters the compression ratio, for example, through a multi-link arrangement between the pistons, the crank shaft 12, and the eccentric shaft 14 (i.e., VCR). Altering the rotational relationship between the eccentric shaft 14 and the crank shaft 12 can be used to reduce engine emissions and/or increase engine efficiency/performance at a given operation condition.

When the engine is operating and no rotational adjustment of the eccentric shaft 14 is desired, the mechanical phasing assembly 300 can lock the rotational relationship between the gear hub 302 and the cradle rotor 304, thereby locking the rotational relationship between the eccentric 14 shaft and the crank shaft 12. In this locked state (see, e.g., FIGS. 19-20), the rotary actuator 313 does not supply a rotary output to the input shaft 315 for the planetary actuator 100, and the first ring gear 200 and the second ring gear 206 rotate in unison with the gear hub 302. Therefore, the spider rotor 308 is not rotated relative to the gear hub 302 and the first locking feature 350 and the second locking feature 352 of each locking assembly 310 may be fully extended away from each other, via the biasing member 358. With the first and second locking features 350 and 352 fully extended away from one another, the first and second locking features 350 and 352 may be in engagement with at least one of an inner surface 359 of the gear hub 302 and an outer surface 336 of the cradle rotor 304, which wedges the first and second locking features 350 and 352 therebetween the cradle rotor 304 and the gear hub 302 (see FIG. 19). This wedging can lock, or restrict movement of, the cradle rotor 304 relative to the gear hub 302 (i.e., the rotary position or phase angle of the cradle rotor 304 is locked with respect to the gear hub 302). Therefore, the rotational relationship between the eccentric shaft 14 and the crank shaft 12 is unaltered, when the mechanical phasing assembly 300 is in the locked state.

If it is desired to advance or retard the eccentric shaft 14 relative to the crank shaft 12, the rotary actuator 313 can be instructed (e.g., via a signal from by the ECM) to provide a rotary displacement/torque through the input shaft 315 to the planetary actuator 100. The direction and magnitude of the rotation of the input shaft 315 may be correlated to a rotation of the first ring gear 200 relative to the second ring gear 206. Since the second ring gear 206 is rotationally coupled to the gear hub 302 via the spring sleeve 403, the first ring gear 200 may be rotated relative to the gear hub 302. The desired magnitude and direction of the relative rotation applied to the first ring gear 200 may be rotationally transferred to the spider rotor 308 by the compliance members 348 and the coupling ring 360. For example, upon rotation of the first ring gear 200, the slots 216 of the first ring gear 200 can engage and circumferentially bias one of the ends 370, 372 of the compliance members 348 (depending on the direction of the relative rotation). This circumferential biasing of the compliance members 348 results in the compliance members 348 applying a corresponding force onto the first set of slots 362 of the coupling ring 360, which then transfers that force onto the protrusions 344 of the spider rotor 308 via the second set of slots 364. The force applied to the spider rotor 308 will be maintained thereon by the compliance members 348 until the cradle rotor 304 reaches the desired rotational position relative to the gear hub 302, which is determined by the rotary input displacement/force provided by the rotary actuator 313. In other words, a force is maintained on the spider rotor 308 until the cradle rotor 304 rotationally aligns with the spider rotor 308 and the mechanical phasing assembly 300 returns to the locked state.

The compliance members 348 also allow the rotary actuator 313 (see FIG. 8) to provide input to the planetary actuator 100 while the mechanical phasing assembly 300 is in a locked state. For example, upon rotation of the first ring gear 200 (via rotary input provided by the rotary actuator 313, FIG. 8), the slots 216 of the first ring gear 200 engage and circumferentially bias one of the ends 370, 372 of the compliance members 348 (depending on the direction of the relative rotation). This circumferential biasing of the compliance members 348 allows the coupling ring 360 to remain rotationally fixed relative to the spider rotor 308 while the first ring gear 200 is rotated, which can occur while the mechanical phasing assembly 300 is locked. The compliance members 348 maintain a force onto the first set of slots 362 of the coupling ring 360, and upon the mechanical phasing assembly 300 entering an unlocked state. The compliance members 348 then transfer that force onto the protrusions 344 of the spider rotor 308 via the second set of slots 364 until the cradle rotor 304 reaches the desired rotational position relative to the gear hub 302.

The rotary force applied by the compliance members 348 to the spider rotor 308 may circumferentially displace the arms 338 of the spider rotor 308 to engage either one of the first locking features 350 or the second locking features 352 out of the locked, or wedged, position, while the other one of the first locking features 350 or the second locking features 352 remain in a locked position. For example, the spider rotor 308 may be rotated clockwise (from the perspective of FIG. 19) a desired rotational amount from the locked state. This rotation of the spider rotor 308 can engage the first locking features 350 and rotationally displace them clockwise into an unlocked position, where the first locking features 350 are displaced out of engagement with the inner surface 359 of the gear hub 302 and the outer surface 336 of the cradle rotor 304. Meanwhile, the second locking features 352 may not be rotationally displaced and can remain in a locked position.

The unlocking of the first locking features 350 can enable the cradle rotor 304 to rotate in the same rotational direction in which the spider rotor 308 was rotated. Simultaneously, the locked position of the second locking features 352 can prevent rotation of the cradle rotor 304 in a direction opposite to the direction the spider rotor 308 was rotated. Thus, in the non-limiting example where the spider rotor 308 is biased clockwise 308, the unlocked position of the first locking features 350 can enable the cradle rotor 304 to rotate clockwise, while the locked position of the second locking features 352 can prevent the cradle rotor 304 from rotating counterclockwise. This can enable the mechanical phasing assembly 300 to harvest energy from eccentric shaft torque pulses that occur in the same direction as the desired relative rotational input provided by the first ring gear 200 on the spider rotor 308. Thus, the planetary actuator 100 is configured to receive a rotary input from the rotary actuator 313, and in response, provide an output to the spider rotor 308 to selectively lock/unlock relative rotation between the cradle rotor 304 and the gear hub 302.

For example, the first ring gear 200 can rotationally bias the spider rotor 308 clockwise (e.g., in a first direction) as eccentric shaft torque pulses are applied to the cradle rotor 304 in the clockwise direction. In turn, the eccentric shaft torque pulses can thereby cause the cradle rotor 304 and the first locking features 350 to rotationally displace in the clockwise direction, while the second locking features 352 remain locked. Accordingly, the first locking features 350 are moved toward the respective second locking features 352, compressing the biasing members 358 therebetween.

Once the clockwise eccentric shaft torque pulse diminishes, the cradle rotor 304 and the first locking features 350 can be in a new rotary position relative to the gear hub 302 (e.g., having moved in the clockwise direction), at which time the first locking features 350 can again lock the cradle rotor 304 until the next eccentric shaft torque pulse in the clockwise direction is applied to the cradle rotor 304.

Once the second locking features 352 have relocked in the new rotational position, an opposing, counterclockwise eccentric shaft torque pulse (e.g., in a second direction) can cause second locking features 352 to unlock. Upon unlocking, the second locking features 352 can be moved in the clockwise direction by the biasing members 358, which release stored energy and decompress. Subsequently, once the counterclockwise eccentric shaft torque pulse diminishes, the second locking features 352 can be in a new rotary position relative to the gear hub 302 (e.g., having moved in the clockwise direction).

This process can continue until, eventually, the cradle rotor 304 will rotationally displace enough such that the first locking features 350 can return to the locked position. When this occurs, the first and second locking features 350 and 352 can both be in the locked position and the mechanical phasing assembly 300 can return to a locked state. The spider rotor 308 can then maintain its rotational position (until it is commanded again to alter the rotational relationship of the eccentric shaft relative to the crank shaft) to ensure that the first locking features 350 and the second locking features 352 remain locked, thereby locking the angular position of the cradle rotor 304 relative to the gear hub 302. It should be appreciated that for a counterclockwise rotation of the spider rotor 308, the reverse of the above described process would occur.

In response to a given rotary input displacement/force applied to the spider rotor 308 through the planetary actuator 100, the cradle rotor 304 rotationally follows the spider rotor 308 and eventually reaches a predefined final rotary position of the spider rotor 308 independent of the magnitude of the eccentric shaft torque pulses. That is, the compliance members 348 will maintain the input displacement/force on the spider rotor 308 provided to by the rotary actuator 313 through the planetary actuator 100 until the compliance members 348 no longer bias the spider rotor 308 and the cradle rotor 304 rotationally follows the spider rotor 308 to the desired rotary position relative to the gear hub 302.

The rotation of the cradle rotor 304 with respect to the gear hub 302 that occurs during this phasing process can vary the rotational relationship between the eccentric shaft 14 and the gear hub 302, which simultaneously alters the rotational relationship between the eccentric shaft 14 and the crank shaft 12. As described above, the amount of rotation achieved by the spider rotor 308 for a given rotary input displacement/torque provided by the rotary actuator 313 can be known based on the gearing between the first sun gear 202 and the first ring gear 200 and the resultant gear ratio defined therebetween. Furthermore, the design of the mechanical phasing assembly 300 can enable the cradle rotor 304 to only be allowed to rotate in the same direction as the spider rotor 308. Thus, during engine operation the mechanical phasing assembly 300 can alter the rotational relationship between the eccentric shaft and the crank shaft independent of engine speed, and the direction and magnitude of the eccentric shaft torque pulses. Also, the mechanical phasing assembly 300 does not need to be continually cycled to reach a desired rotational position (i.e., a desired rotational offset between the eccentric shaft and the crank shaft), as the cradle rotor 304 is constrained to follow the spider rotor 308 to the desired position.

In general, the design and implementation of the planetary actuator 100 only requires an input signal (i.e., the input torque/displacement provided from to the input shaft 315, and thereby to the first sun gear 202 from the rotary actuator 313) to rotate when relative rotation is desired, rather than requiring the rotary actuator 313 to be constantly rotating at the same speed as the eccentric shaft and the gear hub 302. During steady-state operation, when no relative rotation is desired, the rotary actuator 313, and thereby the input shaft 315, may be rotationally fixed (e.g., stationary). During a change in phase (i.e., relative rotation), the rotary actuator 313, and thereby the input shaft 315, is not required to rotate at the same speed the eccentric shaft and the gear hub 302. For example, the output provided to the input shaft 315, and thereby the first sun gear 202, by the rotary actuator 313 may only be required to rotate at the rate of change of the relative angle desired. In this way, for example, the rotation (i.e., speed/displacement) of the input shaft 315 during phasing may be proportional to a magnitude of the relative rotation desired between the cradle rotor 304 and the gear hub 302. As such, a power and speed required by the rotary actuator 313 to rotate the input shaft 315 and achieve the desired relative rotation may be independent of engine speed. That is, the power and speed output by the rotary actuator 313 may not change as a result of a change in engine speed/eccentric shaft speed. In addition, in the non-limiting examples, where a gear reduction exists between the input shaft 315 and the second ring gear 206, the gear reduction may reduce an amount of torque required to be output by the rotary actuator 313 to achieve the desired relative rotation.

Figure 20:
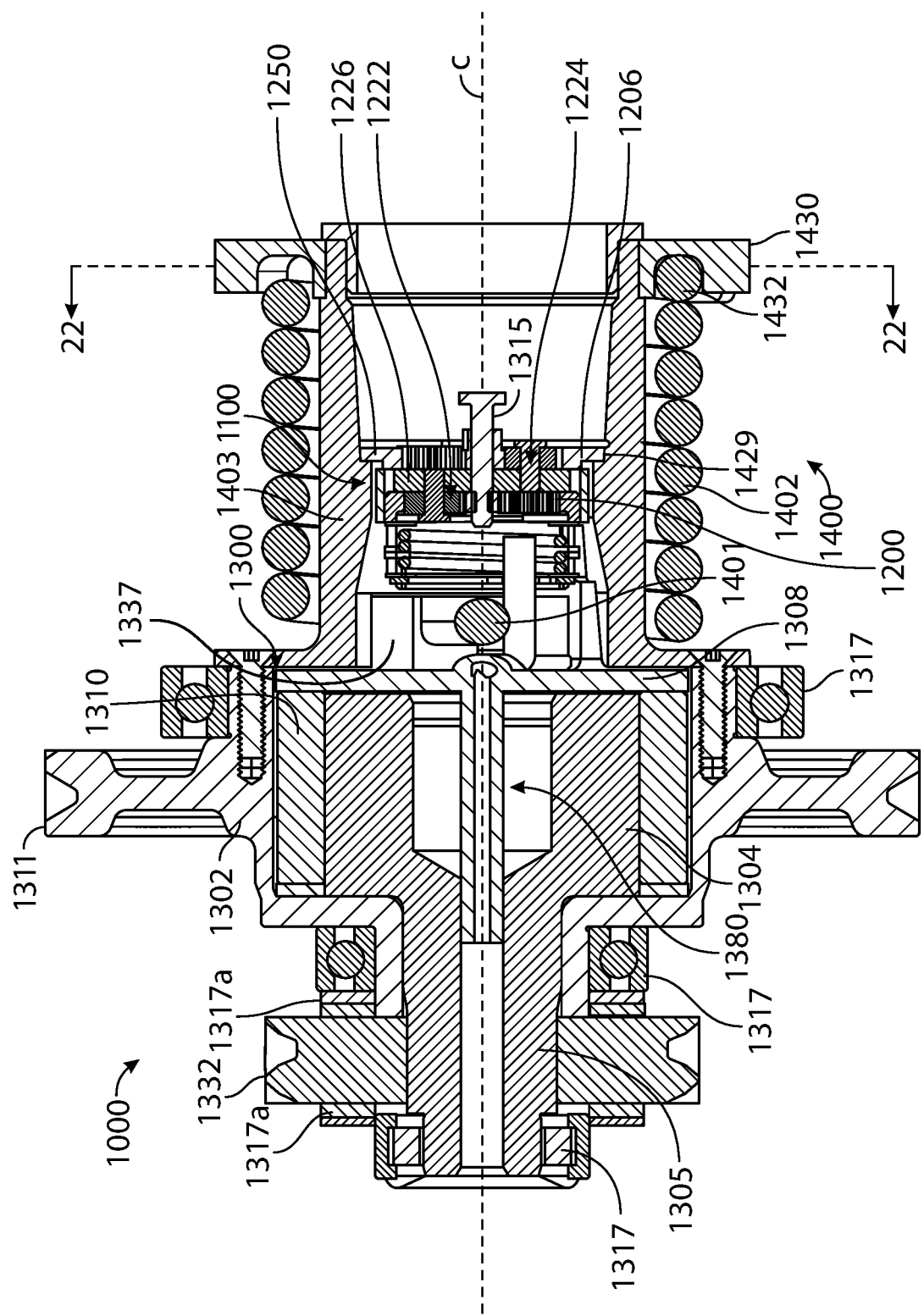
FIG. 20 is a cross-sectional view of a rotational phasing system according to another aspect of the present disclosure.

FIG. 20 illustrates another non-limiting example of a phasing system 1000. The phasing system 1000 is similar to the phasing system 10, with like elements identified using the same reference numerals indexed in the 1000's (e.g., gear hub 302 is related to gear hub 1302), except as described herein or apparent from the figures.

For example, similar to phasing system 10, phasing system 1000 a planetary actuator 1100 installed in a mechanical phasing assembly 1300. In the illustrated non-limiting example, the mechanical phasing assembly 1300 includes a gear hub 1302 (e.g., a first rotary component), a cradle rotor 1304 (e.g., a second rotary component), a spider rotor 1308, a plurality of locking assemblies 1310, a planetary actuator 1100, and a torsion spring assembly 1400. The planetary actuator 1100, the torsion spring assembly 1400, the gear hub 1302, the cradle rotor 1304, the spider rotor 1308, and the plurality of locking assemblies 1310 can each share a common central axis C, when assembled. The torsion spring assembly 1400 can be configured to apply a torque load between the cradle rotor 1304 and the gear hub 1302. The torsion spring assembly 1400 can include a torsion spring 1402, and a spring sleeve 1403. The torsion spring assembly 1400 can be configured to rotationally fix the second ring gear 1206 to the gear hub 1302. The torsion spring assembly can also be configured to attach an end of the torsion spring 1402 to the gear hub 1302 by way of the spring sleeve 1403 and the spring seat 1430 coupled thereto.

In the illustrated non-limiting example, the mechanical phasing assembly 1300 can include one or more bearings 1317 configured to rotationally support internal components of the mechanical phasing assembly, or rotationally support the mechanical phasing assembly 1300 relative to a component of an engine. In the illustrated non-limiting example, bearings 1317 are arranged along a shaft 1305 extending from the cradle rotor 1304. According to some non-limiting examples, one or more thrust bearings 1317a can be arranged adjacent to first and/or second gears 1311, 1332, in particular when the first or second gears 1311, 1332 are configured as helical gears. Additional bearings 1317 are arranged along the outside of the gear hub 1302.

Figure 21:
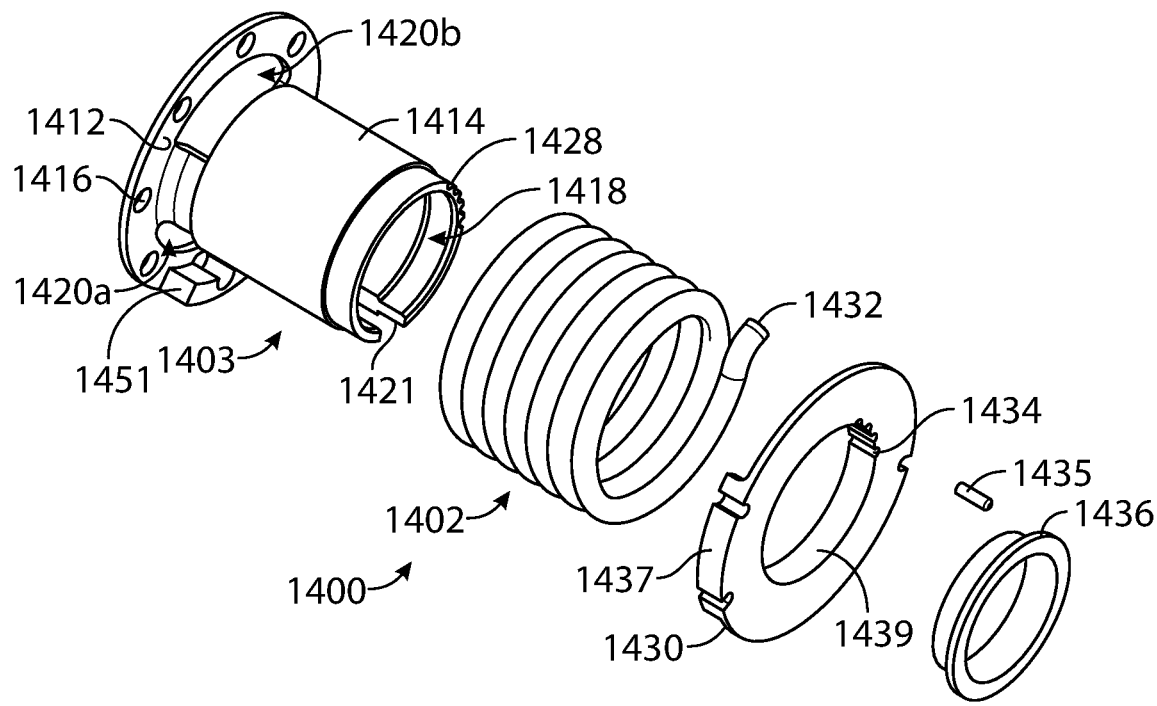
FIG. 21 is an exploded view of a torsion spring assembly of the rotational phasing system of FIG. 20.
Figure 22:
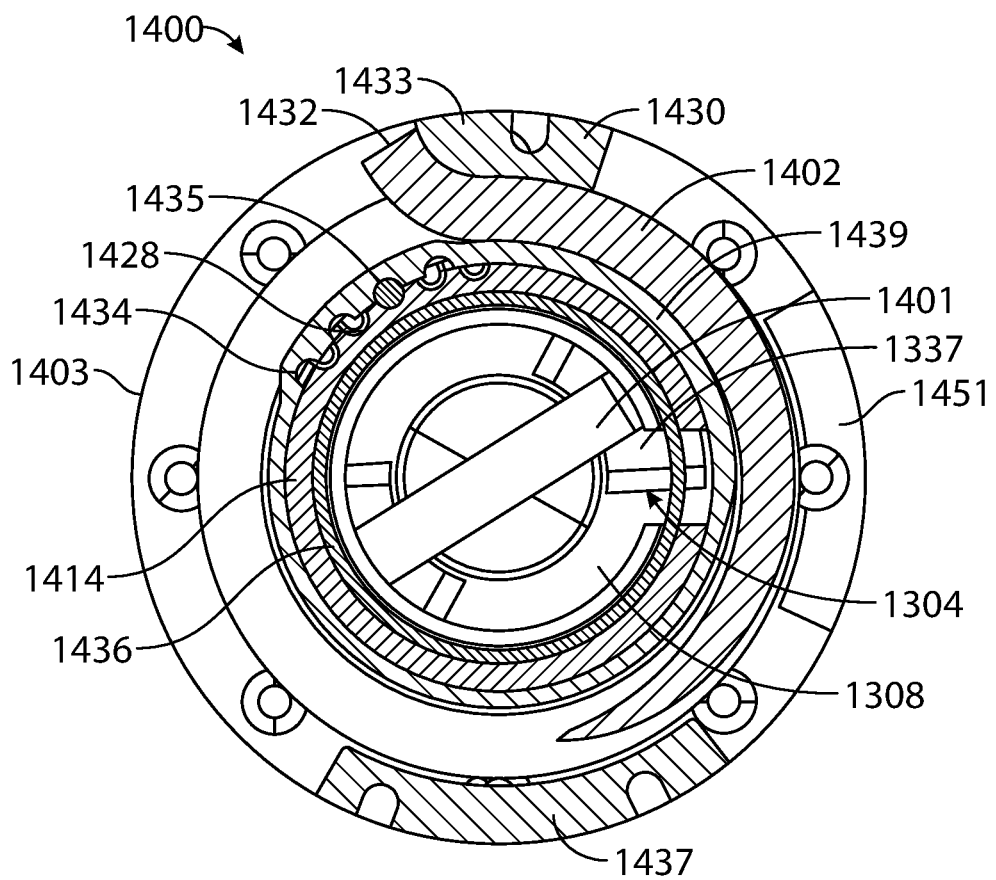
FIG. 22 is a cross-section view of the torsion spring assembly of the rotational phasing system of FIG. 20 taken along line 22-22.

Referring to FIGS. 21-22, the spring sleeve 1403 is configured as a single-piece spring sleeve. In the following figures, subassemblies of aspects of the phasing system 1000 are illustrated, and it is to be understood that some components (e.g., the planetary actuator 1100 and/or gear hub 1302) may not be illustrated to improve the clarity of the illustrated aspects to be described.

The spring sleeve 1403 can include a flange 1412 and an annular protrusion 1414. The annular protrusion 1414 can extend axially away from the flange 1412 to define an interior cavity 1418. The spring sleeve 1403 can have one or more cutouts 1420a, 1420b extending axially along a portion of the annular protrusion 1414. The cutout 1420a can also include a slot 1421 extending axially along the length of the annular protrusion 1414 from the cutout 1420a to the distal end of the spring sleeve 1403 opposite the flange 1412. The cutout 1420a creates an opening configured to receive a first coil end (see FIG. 22) of the torsion spring 1402 therethrough to allow for the torsion spring 1402 to be assembled therewith. Together, the cutouts 1420a, 1420b can provide clearance for the axial protrusions 1337 extending from the cradle rotor 1304 during rotation from phasing events (see FIG. 20).

The spring sleeve 1403 can include a fourth spring support 1451 protruding axially away from the flange 1412 of the spring sleeve 1403 (e.g., in the same direction as the annular protrusion 1414). The fourth spring support 1451 is arranged radially outward from the torsion spring 1402. In the illustrated non-limiting example, the fourth spring support 1451 circumferentially extends along the spring seat 1430 to form an arcuate-shaped protrusion that defines radius of curvature that shares the same center as the radius of curvature defined by the coil portion of the torsion spring 1402. Similar to the first, second, and third spring supports 1433, 1437, 1439 of the spring seat 1430, the fourth spring support 1451 can be configured to prevent stress risers in the torsion spring 1402 and prevent side loading between components mated to the torsion spring 1402. For example, the fourth spring support 1451 can engage an outer part of the torsion spring 1402, adjacent to the first coil end opposite the spring seat 1430, to prevent side loading.

In the illustrated non-limiting example, the spring sleeve 1403 can include a plurality of first slots 1428 and the spring seat 1430 coupled to the spring sleeve 1403 can include a plurality of second slots 1434 that are complementary to the first slots 1428 of the spring sleeve 1403 such that the spring seat 1430 can be rotationally fixed to the second spring sleeve for rotation therewith. In the illustrated non-limiting example, the second slots 1434 axially extend through the third spring support 1439 on the spring seat 1430. With particular reference to FIG. 22, when assembled, the spring seat 1430 can be rotationally aligned with the spring sleeve 1403 to align at least one of the first slots 1428 with at least one of the second slots 1434 so that the first slot 1428 and the second slot 1434 together form a keyway to receive a key 1435 therein. The key 1435 is configured to rotationally fix the spring seats 1430 to the spring sleeve 1403. An annular ring 1436 can be received within an opening formed by the spring seat 1430 to prevent axial displacement of the key 1435 relative to the spring seat 1430.

As illustrated in FIG. 20, the first coil end 1401 of the torsion spring 1402 can be coupled to the cradle rotor 1304 and the second coil end 1432 of the torsion spring can be engaged by the spring seat 1430, and thereby the gear hub 1302 via the spring sleeve 1403. In this configuration, a torque load can be applied by the torsion spring 1402 between the gear hub 1302 and the cradle rotor 1304.

Figure 23:
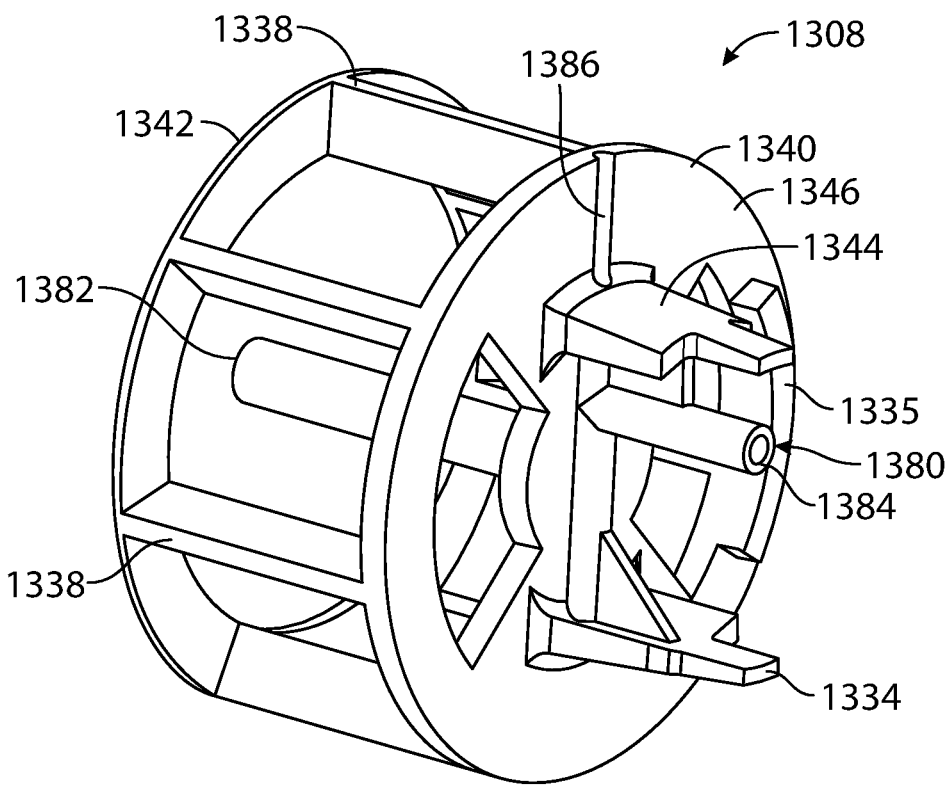
FIG. 23 is a perspective view of a spider rotor of the rotational phasing system of FIG. 20.
Figure 24:
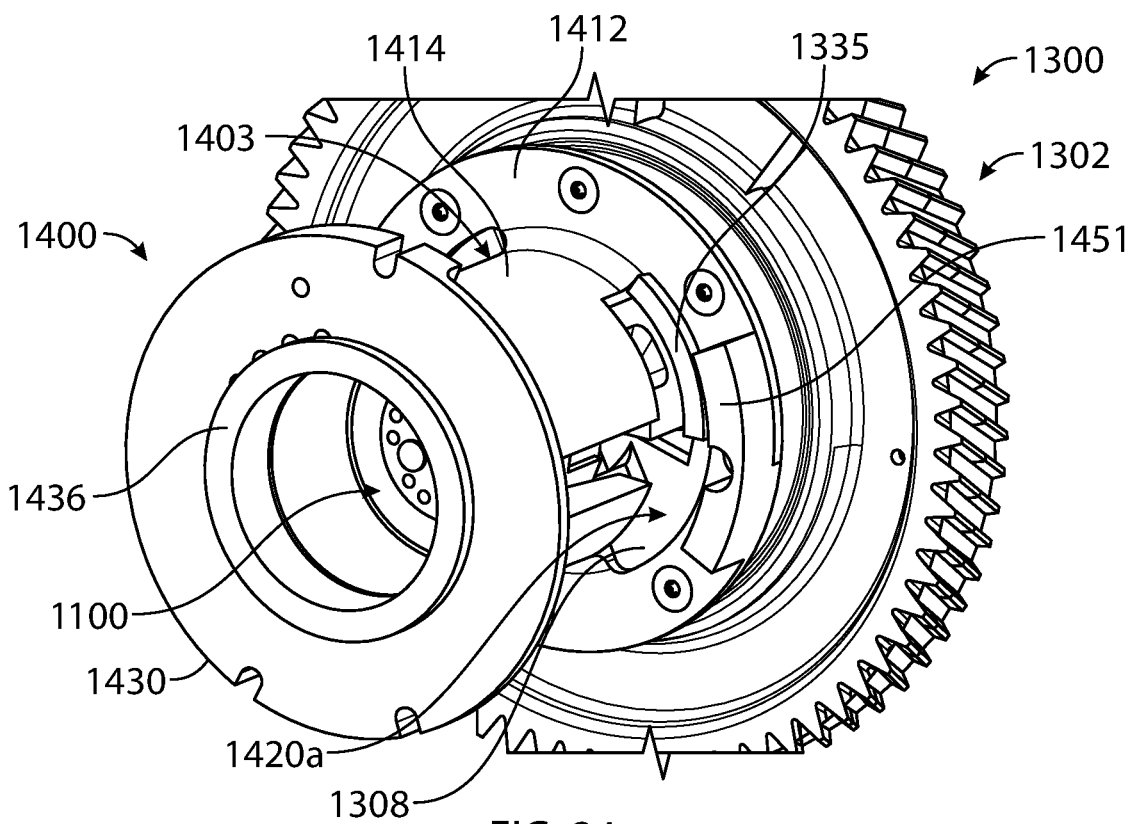
FIG. 24 is a perspective view of the rotational phasing system of FIG. 20 with a torsion spring of the torsion spring assembly of FIG. 21 not illustrated to reveal underlying structures.

Referring now to FIGS. 23-24, the spider rotor 1308 of the mechanical phasing assembly 1300 may include a plurality of arms 1338 that extend axially between a first cage ring 1340 and a second cage ring 1342, and one of the plurality of locking assemblies 1310 may be arranged circumferentially between each circumferentially adjacent pair of the arms 1338 (see, FIG. 20; see also FIG. 16 showing locking assemblies 310 in the spider rotor 308). In the illustrated non-limiting example, the spider rotor 1308 can include an oil passage 1380 integrally formed into the spider rotor 1308. The oil passage 1380 is configured to receive oil at an inlet 1382 and distribute that oil to either one or both of components of the mechanical phasing assembly 1300 or the planetary actuator 1100 via at least one outlet. In the illustrated non-limiting example, the oil passage 1380 includes a first outlet 1384 extending axially away from a first surface 1346 of the spider rotor 1308 and is directed at the planetary actuator 1100 (see FIG. 20). The oil passage 1380 also includes a second outlet 1386 defined by a conduit formed along the first surface 1346 of the spider rotor 1308 and directed radially outwards from the spider rotor 1308. In the illustrated non-limiting example, the second outlet 1386 is arranged orthogonal to the first outlet 1384.

The spider rotor 1308 can also include an arcuate protrusion 1335 that extend axially away from the first surface 1346 of the spider rotor 1308. When assembled (see FIG. 24), the spring sleeve 1403 can be installed onto the gear hub 1302 such that the arcuate protrusion 1335 of the spider rotor 1308 are received within the opening 1420*a* of the spring sleeve 1403. The arcuate protrusion 1335 of the spider rotor 1308 can engage ends of the opening 1420*a* in the spring sleeve 1403 (see FIG. 21) to mechanically limit the overall relative rotation between the cradle rotor 1304 (in rotational communication with the eccentric shaft 14) and the gear hub 1302 (in rotational communication with the crank shaft 12, see FIG. 1). This can mechanically limit how much relative rotation can exist between the eccentric shaft 14 and the crank shaft 12 as the ends of the opening 1420*a* in the spring sleeve 1403 can act as rotational end stops for the arcuate protrusion 1335 on the spider rotor 1308, which follows rotation of the cradle rotor 1304.

FIGS. 25-28 illustrate another non-limiting example of a torsion spring assembly 2400 configured for use in either of the phasing systems 10 or 1000. The torsion spring assembly 2400 is similar to the torsion spring assemblies 400, 1400, with like elements identified using the same reference numerals indexed in the 2000's (e.g., torsion spring 402 is related to torsion spring(s) 2402), except as described herein or apparent from the figures.

For example, similar to torsion spring assemblies 400, 1400, the torsion spring assembly 2400 can be configured to apply a torque load between the cradle rotor 2304 and a gear hub (e.g., gear hub 302, 1302). The torsion spring assembly 2400 can include two torsion springs 2402, including a first torsion spring 2402A, a second torsion spring 2402B, and a spring sleeve 2403. The spring sleeve 2403 can include a flange 2412 and an annular protrusion 2414. As noted above, the flange 2412 can include a plurality of apertures 2416. Each of the plurality of apertures 2416 may be arranged to align with corresponding apertures on a front surface of a gear hub (e.g., gear hub 302, 1302). The annular protrusion 2414 can extend axially away from the flange 2412 to define an interior cavity 2418. The interior cavity 2418 may be dimensioned to axially receive at least a portion of a planetary actuator therein (e.g., planetary actuator 100, 1100).

Figure 25:
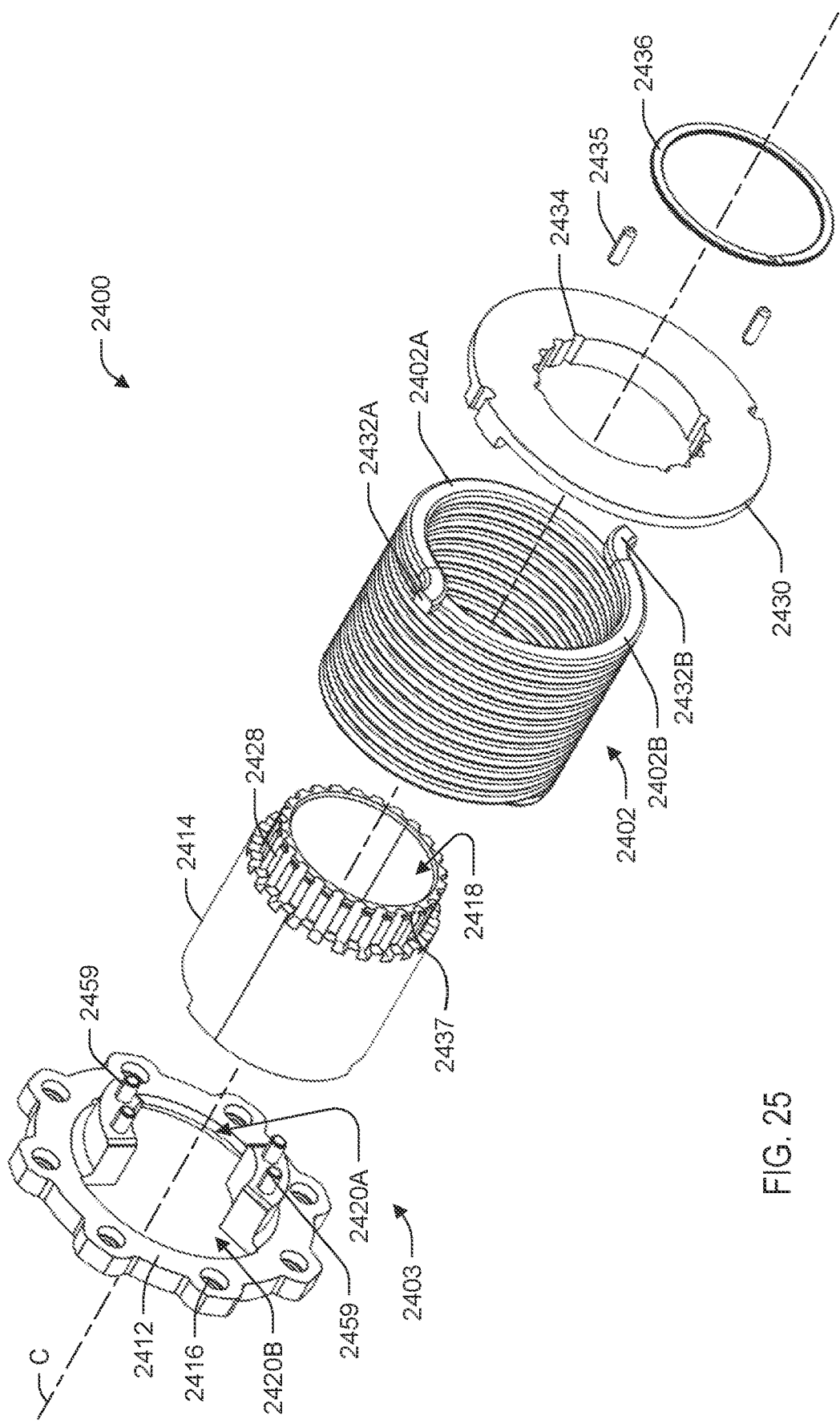
FIG. 25 is an exploded view of a torsion spring assembly having a dual torsion spring arrangement for use with a rotational phasing system, including those of FIGS. 1 and 20.
Figure 28:
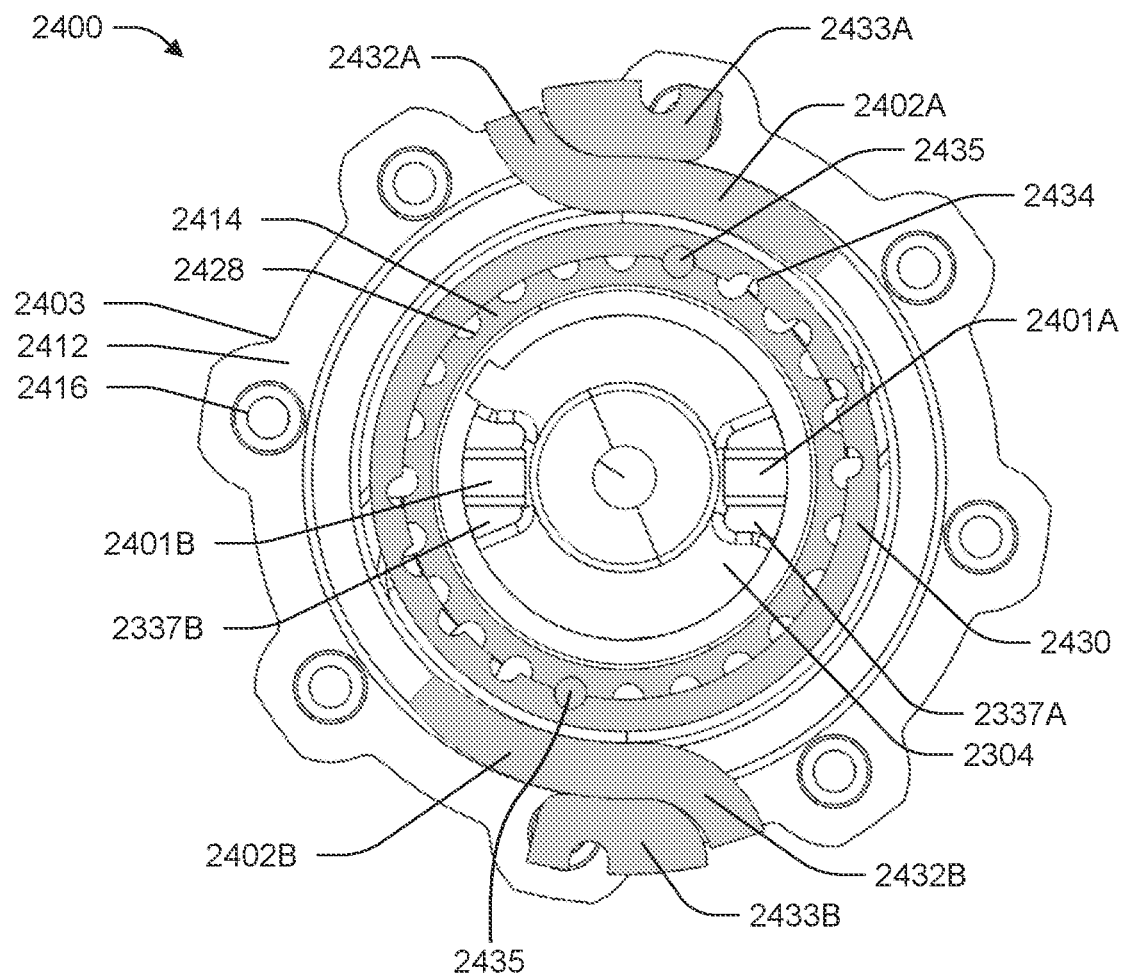
FIG. 28 is a cross-section view of the torsion spring assembly of FIG. 25 taken in a plane passing through the spring seat and perpendicular to the central axis, similar to line 22-22 of FIG. 20.

As shown in FIGS. 25 and 28, the spring sleeve 2403 can have one or more cutouts 2420A, 2420B extending axially along a portion of the spring sleeve 2403. The cutouts 2420A, 2420B can create an opening configured to receive a first coil end 2401A of the first torsion spring 2402A and a first coil end 2401B of the second torsion spring 2402B, respectively, to allow for the torsion springs 2402A, 2402B to be assembled therewith.

In the illustrated non-limiting example, the annular protrusion 2414 is removably coupled to the flange 2412 of the spring sleeve 2403. For example, the flange 2412 includes a plurality of alignment pins 2459 extending axially outward from the flange 2412 toward the spring seat 2430. The annular protrusion 2414 can include a plurality of bores (not shown) that correspond to the plurality of alignment pins 2459 for receiving the alignment pins 2459 therein. The removable coupling between the flange 2412 and the annular protrusion 2414 can improve the ease of which the torsion spring assembly 2400 is assembled.

As illustrated in FIG. 28, the spring seat 2430 can be configured to secure and engage a second coil end 2432A of the first torsion spring 2402A and a second coil end 2432B of the second torsion spring 2402B. For example, the spring seat 2430 can include a spring supports 2433A, 2433B protruding axially away from the spring seat 2430 towards the flange 2412 of the spring sleeve 2404. The spring supports 2433A, 2433B are also arranged radially outward from the first and second torsion springs 2402A, 2402B. The spring supports 2433A, 2433B are configured to engage the second coil end 2432A of the first torsion spring 2402A and the second coil end 2432B of the second torsion spring 2402B, respectively, to prevent the first and second torsion springs 2402A, 2402B from un-coiling toward an unloaded state (e.g., unbiased or without preload).

Referring again to FIG. 25, in the illustrated non-limiting example, the spring sleeve 2403 can include a plurality of first slots 2428 and the spring seat 2430, which can be coupled to the spring sleeve 2403, can include a plurality of second slots 2434 that are complementary to the first slots 2428 of the spring sleeve 2403, such that the spring seat 2430 can be rotationally fixed to the annular protrusion 2414 for rotation therewith. In the illustrated non-limiting example, the second slots 2434 axially extend along an internal surface of the spring seat 2430 to interface with the end of the annular protrusion 2414. With additional reference to FIG. 28, when assembled, the spring seat 2430 can be rotationally aligned with the spring sleeve 2403 to align at least one of the first slots 2428 with at least one of the second slots 2434 such that the first slot 2428 and the second slot 2434 together form a keyway to receive a key 2435 therein. In the illustrated non-limiting example, two of the first slots 2428 align with two of the second slots 2434, such that the aligned slots of the first slots 2428 and the second slots 2434 form two keyways to receive keys 2435 therein. In the illustrated non-limiting example, the first and second slots 2428, 2434 are configured such that the two aligned slots will be circumferentially separated relative to each other. For example, the two aligned slots can be on radially opposing sides of the spring sleeve 2403. The keys 2435 are configured to rotationally fix the spring seat 2430 to the spring sleeve 2403. An annular ring 2436 (e.g., a snap ring, see FIG. 25) can be received within a snap ring groove 2437 on an end of the annular protrusion 2414 to couple the spring seat 2430 to the spring sleeve 2403 and to prevent axial displacement of the keys 2435 relative to the spring seat 2430.

As illustrated in FIG. 28, the first coil end 2401A of the first torsion spring 2402A and the first coil end 2401B of the second torsion spring 2402B can each be coupled to the cradle rotor 2304, and the second coil end 2432A of the first torsion spring 2402A and the second coil end 2432B of the second torsion spring 2402B can each be engaged by the spring seat 2430, and thereby the gear hub (e.g., gear hub 302, 1302) via the spring sleeve 2403. In this configuration, a torque load can be applied by the first and second torsion springs 2402A, 2402B between the gear hub and the cradle rotor 2304.

Figure 26:
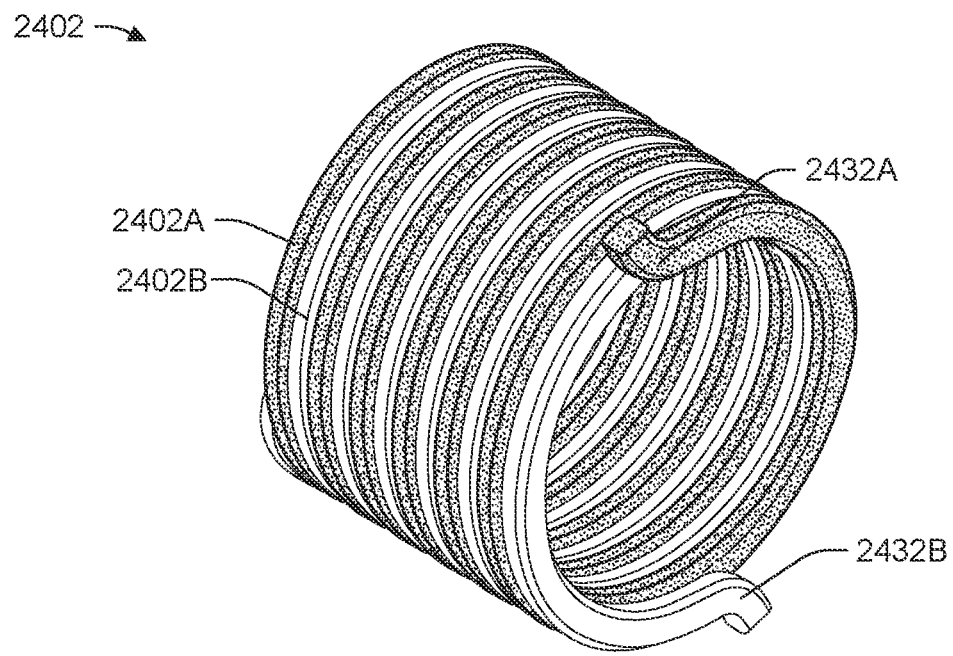
FIG. 26 is a perspective view of torsion springs of the torsion spring assembly of FIG. 25 in a nested configuration.
Figure 27:
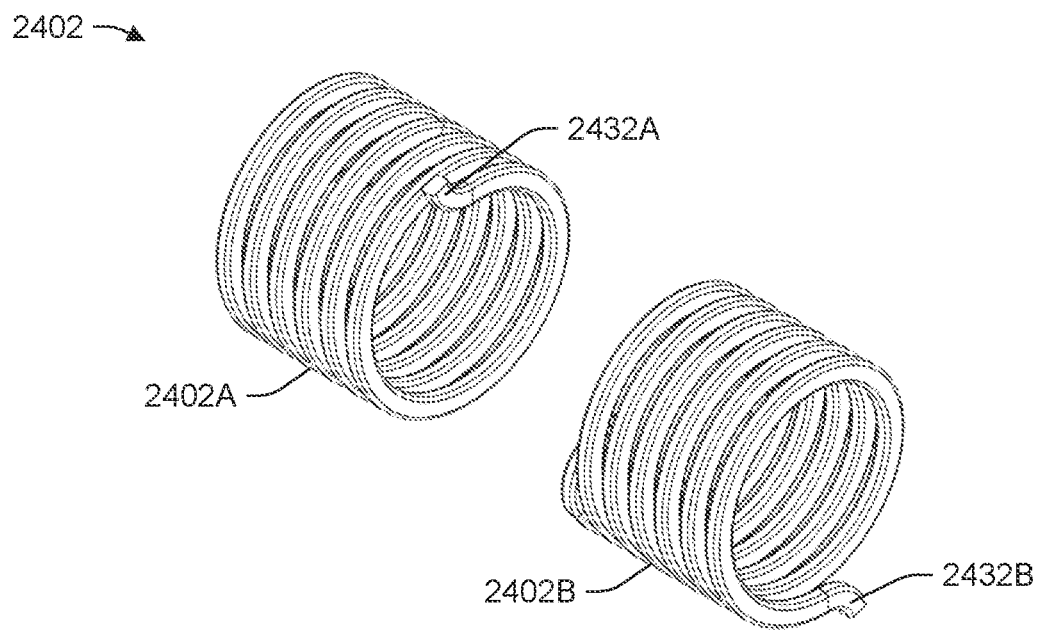
FIG. 27 is a perspective view of the torsion springs of FIG. 26 in a separated configuration.

As illustrated in FIGS. 26 and 27, the first torsion spring 2402A and the second torsion spring 2402B (illustrated as transparent in FIG. 26) can be arranged in a nested configuration. In the illustrated non-limiting example, the first torsion spring 2402A can define a first coil diameter and the second torsion spring 2402B can define a second coil diameter. In the illustrated example, the first coil diameter is equal to the second coil diameter. In other examples, the first and second coil diameters can be different. In the nested configuration, a helical pitch of each of the first and second torsion springs 2402A, 2402B is configured to allow the first and second torsion springs 2402A, 2402B to fit within same radial and axial envelope. That is, the first torsion spring 2402A can define a spring envelope in the axial and radial direction, owing to the axial length of the first torsion spring 2402A and the first coil diameter. The second torsion spring 2402B can reside within the spring envelope defined by the first torsion spring 2402A, without interfering with the operation of the first torsion spring 2402A. That is, for example, the helical pitch of the first and second torsion springs 2402A, 2402B is such that a coil of the second torsion spring 2402A can fit axially between two adjacent coils of the first torsion spring 2402A (e.g., to form a double helical torsion spring 2402). In the illustrated non-limiting example, the spring rate of the first torsion spring 2402A and the spring rate of the second torsion spring 2402B are equal. In other non-limiting examples, the spring rates of the first and second torsion springs 2402A, 2402B can be different.

The nested pair of first and second torsion springs 2402A, 2402B can eliminate rotational imbalances that can be inherent in a single torsion spring configuration. For example, the use of two matching torsion springs (e.g., in spring rate, helical pitch, etc.) can provide a rotationally balanced phasing assembly, which can otherwise be impossible to do with a single torsion spring design due to a change in the number of active body coils in the torsion spring during rotational deflection of the torsion spring. The balanced and nested pair of torsion springs undergo this same change in active body coils, but the active body coils of the first torsion spring 2402A can cancel out the active body coils of the second torsion spring 2402B with respected to the centralized axis of rotation (e.g., the central axis, C).

Figure 29:
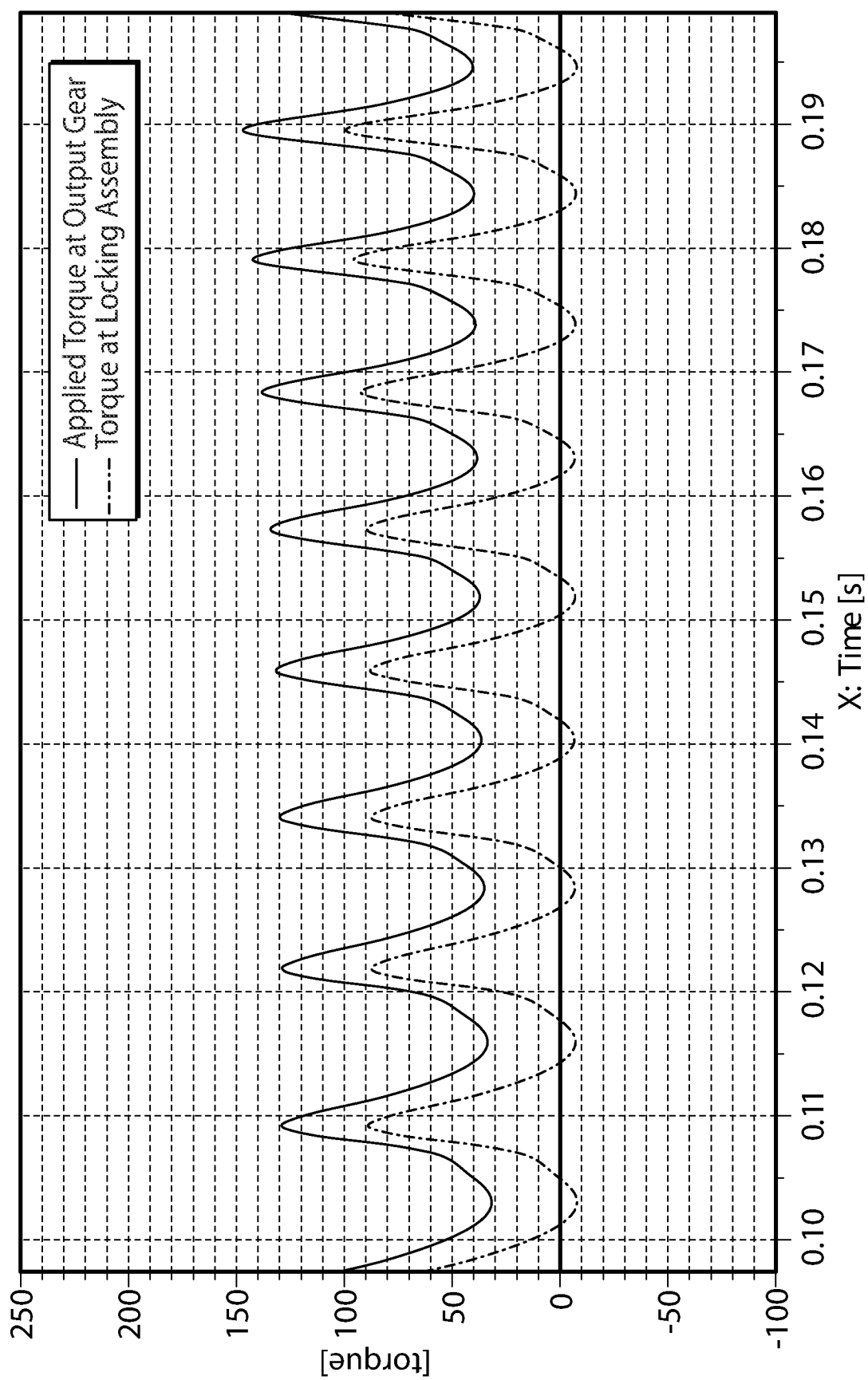
FIG. 29 is a plot of eccentric shaft torque pulses over time.

In the following description of operation, reference will be made to the rotational phasing system 10 of FIG. 1. It is to be understood that the following description also applies to the rotational phasing system 1000 of FIG. 20 and, where applicable, the torsion spring assembly 2400 of FIG. 25. Referring now to FIG. 29, it can be seen that the torsion spring(s) 402, 1402, 2402 can be configured to apply an offset torque (e.g., a first torque load) that is internal to the rotational phasing system 10, 1000. By applying a torque differential across the gear hub 302 and the cradle rotor 304, the torsion spring 402 can offset the net torque (e.g., a second torque load) caused by the torque pules from the eccentric shaft, or between the eccentric shaft 14 and the crank shaft 12 (i.e., between the first gear 311 on the gear hub 302 and the second gear 332 attached to the cradle rotor 304. That is, torque provided by the torsion spring subtracts from (i.e., counteracts) the applied torque. Accordingly, the torque provided by the torsions spring can be set so that the locking mechanism experiences both positive and negative torque (i.e., torques in opposing directions). By setting the torque of the torsion springs in this manner, the mechanical phasing assembly can adjust phase angle in both directions (e.g., clockwise and counterclockwise), as generally described above.

For example, the torque pulses from the eccentric shaft may result in in a net torque applied between the gear hub 302 and the cradle rotor 304 being in a first direction (i.e., net positive torque pulses). The torsions spring 402 can be configured to apply a torque load between the gear hub 302 and the cradle rotor 304 in a second direction (i.e., a negative torque) opposite the first direction. The torque load delivered by the torsion spring 402 can offset the net positive torque pulses between the gear hub 302 and the cradle rotor 304 in the second direction (e.g., resulting in a vertical shift or offset of the torque pulses from the eccentric shaft, illustrated as a vertical shift of the pulse curve in FIG. 29). It should be appreciated that positive or negative torque is a relative term depending on the perspective in which the loading case is analyzed. Accordingly, the terms positive and negative could be switched. Additionally, it should be appreciated that the torsion spring could be configured or installed to provide a torque in any direction (e.g., a first torque load), so long as it offsets the torque pulses from the eccentric shaft (e.g., a second torque load).

In some applications, such as the non-limiting example illustrated in FIG. 20, the torque pulses from the eccentric shaft that are applied to the cradle rotor 304 may not result in a net-zero or bi-directional torque pulses between the cradle rotor 304 and the gear hub 302. In some cases, this may prevent a mechanical phasing assembly from achieving a two-way locking functionality as torque pulses (e.g., net torque) should be applied in two directions (i.e., with the positive and negative net torque pulses crossing zero on the y-axis of FIG. 29) to more effectively lock the cradle rotor 304 to the gear hub 302 via the "wedging" action of the locking assemblies 310.

As shown in FIG. 29, the arrangement of the torsion spring 402 can apply an offset torque that is internal to the mechanical phasing assembly 300. The torque load applied by the torsion spring 402 results in a torque load to be constantly applied between the gear hub 302 and the cradle rotor 304, which offsets the torque pulses from the eccentric shaft. In the illustrated non-limiting example, the torque load applied by the torsion spring 402 is unidirectional. The offset torque load applied by the torsion spring 402 can offset the net torque load experienced by the mechanical phasing assembly 300 (i.e., including the eccentric shaft torque pulses) such that the net torque experienced by the mechanical phasing assembly 300 is bi-directional (i.e., crosses zero on the y-axis of FIG. 29S). Thus, the torsion spring 402 can enable the mechanical phasing assembly to achieve a two-way locking functionality to more effectively lock the cradle rotor 304 to the gear hub 302 via the "wedging" action of the locking assemblies 310. Particularly in cases, such as some VCR internal combustion engines, where net torque pulses delivered by the eccentric shaft may be net positive or net negative. In some non-limiting examples, the torsion spring 402 can apply a linear offset to the eccentric shaft torque pulses. In other non-limiting examples, the torsion spring 402 can apply a constant, unidirectional torque load.

In some non-limiting examples, the torsion spring 402 may be pre-biased (e.g., preloaded). For example, referring to FIGS. 11, 22, and 25 the spring seat 430, 1430, 2430 can be rotationally locked with the spring sleeve 403, 1403, 2403 in a plurality of distinct positions. Each of the plurality of distinct positions defines a unique torque load provided by the torsion spring(s) 402, 1402, 2402 which determines the magnitude of the pre-biasing of the torsion spring(s) 402, 1402, 2402. The pre-biasing of the torsion spring(s) 402, 1402, 2402 can be adjusted based on a rotational position of the spring seat 430, 1430, 2430 relative to the cradle rotor 304, 1304 (see FIGS. 9, 11, and 22). That is, the position of the spring seat 430, 1430, 2430 relative to the spring sleeve 403, 1403, 2403 can be adjusted owing to the first slots 428, 1428, 2428 and the second slots 434, 1434, 2434 thereon.

For example, with particular reference to the torsion spring assembly 400 of FIG. 11, the pre-biasing of the torsion spring 402 can be set by coupling the first coil end 401 of the torsion spring 402 to the cradle rotor 304. Then, the opposing second coil end 432 of the torsion spring 402 can be coupled to the spring seat 430. The spring seat 430 can then be rotated relative to the spring sleeve 403 to a position that provides a desired preload on the torsion spring. At that point, at least one first slot 428 among the plurality of first slots 428 on the spring sleeve 403 can be selectively aligned with at least one second slot 434 among the plurality of second slots 434 on the spring seat 430. Once selectively aligned the first and second slots 428, 434, which in this example are configured as splines, can mesh with each other to rotationally lock the spring sleeve 403 to the spring seat 430. In the illustrated non-limiting example, a plurality of splines of the first slots 428 mesh with a plurality of splines of the second slots 434.

For example, the torsion spring assembly 400 can be assembled in a first orientation where the first coil end 401 of the torsion spring 402 is installed into the spring recesses 339 on the cradle rotor 304 and the second coil end of the torsion spring 402 can be installed into the spring seat 430. In the first orientation, the spring seat 430 may be in a first rotational position relative to the spring sleeve 403, thereby defining a first torque load (in some cases, a zero torque load). The torsion spring assembly 400 can then be adjusted to a second rotational positions among a plurality of possible rotational positions by rotation of the spring seat 430 relative to the spring sleeve 403 while the second slots 434 of the spring seat 430 are out of engagement with the first slots 428 on the spring sleeve 403. The second slots 434 of the spring seat 430 can then be re-engaged with the first slots 428 on the spring sleeve 403, thereby securing the spring seat 430 in the second rotational position defining a second torque load.

In some non-limiting examples, the torsion spring 402 can apply a torque load (e.g., a first torque load) between about 5 Nm and about 200 Nm. In other non-limiting examples, the torsion spring 402 can apply a torque load between about 20 Nm and about 100 Nm. In some non-limiting examples, the torsion spring 402 can apply a torque load between about 40 Nm and about 80 Nm. The arrangement of the first and second slots 428, 434 can provide a rotational adjustment between the spring sleeve 403 and the spring seat 430 between about 1 degree and about 10 degrees. In some non-limiting examples, the slots can provide a rotational adjustment between about 3 degrees and about 5 degrees. In some non-limiting examples, two or more spring seats 430 can be provided, each with a plurality of slots that are slightly offset from the other spring seats, to further refine the rotational adjustment capability.

Similarly, with particular reference to the torsion spring assembly 1400 of FIG. 22, the pre-biasing of the torsion spring 1402 can be set by coupling the first coil end 1401 of the torsion spring 1402 to the cradle rotor 1304. Then, the opposing second coil end 1432 of the torsion spring 1402 can be coupled to the spring seat 1430. The spring seat 1430 can then be rotated relative to the spring sleeve 1403 to a position that provides a desired preload on the torsion spring. At that point, at least one first slot 1428 among the plurality of first slots 1428 on the spring sleeve 1403 can be selectively aligned with at least one second slot 1434 among the plurality of second slots 1434 on the spring seat 1430. Once selectively aligned one slot from each of the first and second slots 1428, 1434, together form a keyway in which a key 1435 can be inserted to rotationally lock the spring sleeve 1403 to the spring seat 1430. In the illustrated non-limiting example, only one slot from the plurality of first slots 1428 is in alignment with only one slot from the plurality of second slots 1434. That is, in any given rotational orientation of the spring seat 1430, only a single first slot 1428 can be in alignment with a single second slot 1434.

Similarly, with particular reference to the torsion spring assembly 2400 of FIG. 28, the pre-biasing of the first and second torsion springs 2402A, 2402B can be set by coupling the first coil ends 2401A, 2401B of the first and second torsion springs 2402A, 2402B to the cradle rotor 2304. Then, the opposing second coil ends 2432A, 2432B of the first and second torsion springs 2402A, 2402B can be coupled to the spring seat 2430. The spring seat 2430 can then be rotated relative to the spring sleeve 2403 to a position that provides a desired preload on the torsion springs. At that point, two of the first slots 2428 among the plurality of first slots 2428 on the spring sleeve 2403 can be selectively aligned with two second slots 2434 among the plurality of second slots 2434 on the spring seat 2430. Once selectively aligned, two slots from each of the first and second slots 2428, 2434, together form two keyways in which a key 2435 can be inserted to rotationally lock the spring sleeve 2403 to the spring seat 2430.

In some non-limiting examples, the first torque load applied by the torsion spring(s) 402, 1402, 2402 can be dependent upon the relative rotational offset between the first ring gear 200, 1200 and the second ring gear 206, 1206. That is, with particular reference to FIG. 11, as the first ring gear 200 is rotationally shifted by the rotary actuator 313 relative to the second ring gear 206, the spider rotor 308, which is coupled to the first coil end 401 of the torsion spring 402, is rotationally shifted from the spring seat 430, which is coupled to the second coil end 432 of the torsion spring 402 (see FIG. 8). The rotational shifting between the first coil end 401 and the second coil end 432 of the torsion spring 402 varies the torque load delivered therefrom. The same also applies to the torsion spring assembly 1400 of FIG. 22 and 2400 of FIG. 25.

Figure 30:
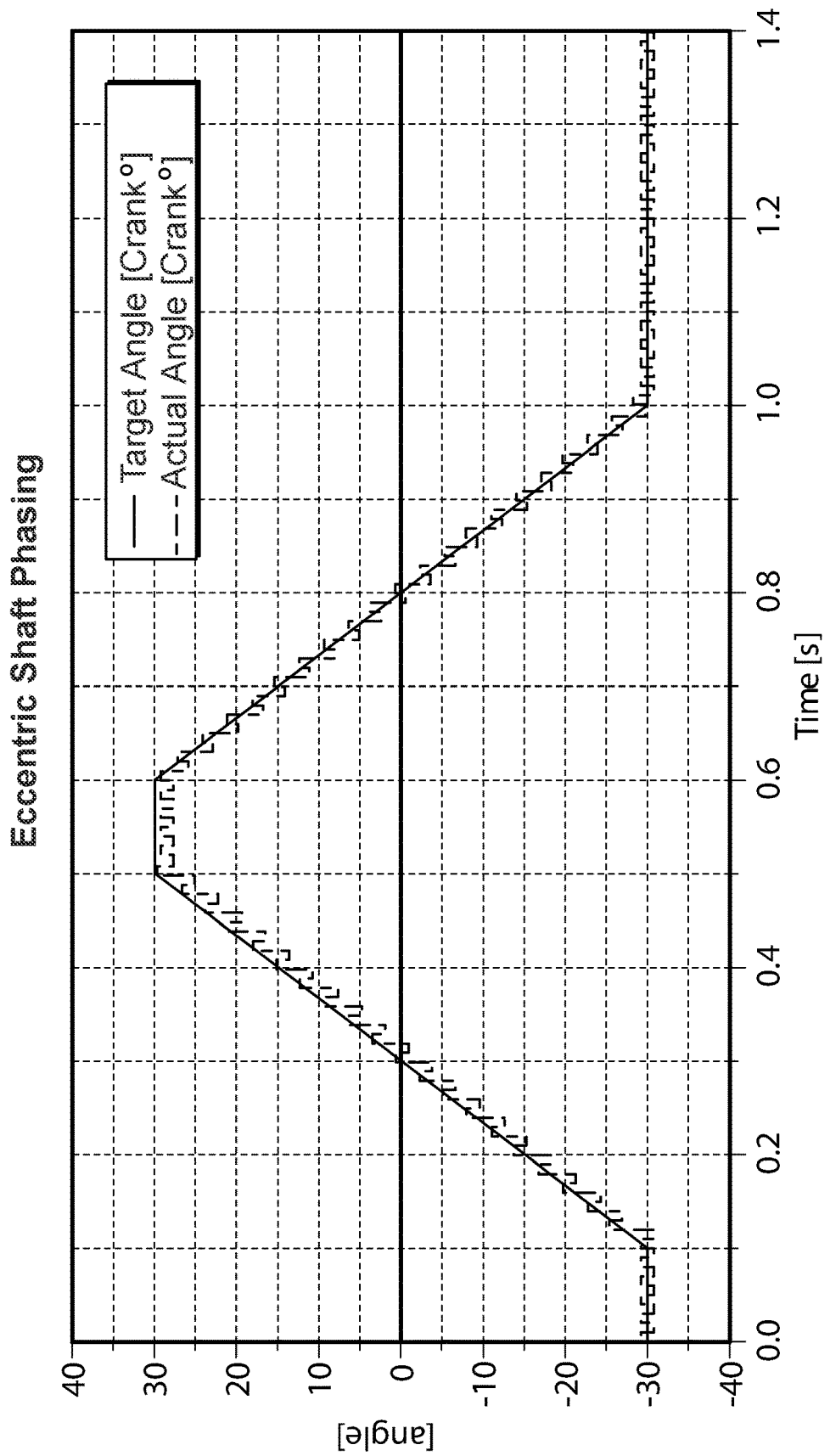
FIG. 30 is a plot of phase angle between an eccentric shaft and a crank shaft over time.

Referring now to FIGS. 11 and 30, in some non-limiting examples, the mechanical phasing assembly 300 may me mechanically limited to a predefined range of phase angle or rotational offset. In the illustrated non-limiting example, the gear hub 302 and the cradle rotor 304 can be rotated from a minimum phase angle (e.g., 0 degrees of phase angle) to a maximum phase angle (e.g., 60 degrees of phase angle, illustrated in FIG. 30 as −30 degrees to +30 degrees). The VCR internal combustion engine can be configured to be in a high compression ratio (CR) configuration when the phase angle between the gear hub 302 and the cradle rotor 304 is at the minimum phase angle and the VCR internal combustion engine can be configured to be in a low CR configuration when the phase angle between the gear hub 302 and the cradle rotor 304 is at the maximum phase angle.

As noted above, the torque load applied by the torsion spring 402 can be dependent upon the phase angle. As the phase angle increases, the torque load applied by the torsion spring 402 may also increase. Thus, the torque load applied by the torsion spring 402 may be at a minimum torque load when the VCR internal combustion engine is in a high CR configuration (i.e., at a minimum phase angle). Accordingly, as the phase angle increases towards the maximum phase angle, the torque load provided by the torsion spring 402 also increases towards a maximum torque load when the VCR internal combustion engine is in a low CR configuration (i.e., at a maximum phase angle). In some non-limiting examples, the torsion spring 402 can hold the mechanical phasing assembly 300 such that there is a 0 degrees phase angle between the gear hub 302 and the cradle rotor 304. That is, the torsion spring 402 can be configured to bias the phasing system 10 towards the minimum phase angle configuration. Thus, the torsion spring 402 may hold the VCR internal combustion engine in a high CR configuration. The same also applies to the torsion spring assembly 1400 of FIG. 20 and 2400 of FIG. 25.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A variable compression ratio (VCR) phasing system for varying a rotational relationship between a crank shaft and an eccentric shaft, the VCR phasing system comprising:
   a gear hub configured to be in rotational communication with a crank shaft;
   a cradle rotor configured to be in rotational communication with an eccentric shaft;
   a spider rotor arranged between the gear hub and the cradle rotor, the spider rotor being configured to selectively lock and unlock relative rotation between the gear hub and the cradle rotor;
   a planetary actuator coupled to the gear hub and the spider rotor, the planetary actuator configured to receive a rotary input and to provide a corresponding rotary output to the spider rotor to unlock relative rotation between the cradle rotor and the gear hub; and
   a first torsion spring and a second torsion spring coupled between the gear hub and the cradle rotor, wherein the first torsion spring and the second torsion spring are configured to apply a first torque load in a first direction between the gear hub and the cradle rotor to offset a second torque load applied in a second direction by at least one of the eccentric shaft and the crank shaft.

2. The VCR phasing system of claim 1, wherein the first torque load is between about 5 Nm and about 200 Nm.

3. The VCR phasing system of claim 1, further comprising a spring sleeve coupled to the gear hub, wherein the spring sleeve extends axially away from the gear hub and defines an interior cavity.

4. The VCR phasing system of claim 3, wherein a coil portion of each of the first torsion spring and the second torsion spring circumferentially extends around an outside of the spring sleeve.

5. The VCR phasing system of claim 4, wherein the first torsion spring and second torsion spring each include a first coil end and a second coil end opposite the first coil end with the coil portion arranged therebetween, and
   wherein the first coil end of the first torsion spring and the first coil end of the second torsion spring are in engagement with the cradle rotor, and the second coil end of the first torsion spring and the second coil end of the second torsion spring are in engagement with a spring seat that is coupled to the spring sleeve.

6. The VCR phasing system of claim 5, wherein the spring seat is configured to be rotationally locked with the spring sleeve in a plurality of rotational positions, such that each of the plurality of rotational positions defines a unique combined torque load from the first torsion spring and the second torsion spring.

7. The VCR phasing system of claim 6, wherein the spring sleeve includes a plurality of first slots and the spring seat includes a plurality of second slots, which are arranged so that selective alignment between two first slots among the plurality of first slots with two second slots among the plurality of second slots is configured to rotationally lock the spring sleeve to the spring seat.

8. The VCR phasing system of claim 7, wherein the two first slots and the two second slots, when aligned, together form a first and second keyway configured to receive a first key and a second key, respectively.

9. The VCR phasing system of claim 1, wherein the first torsion spring defines a spring envelope in an axial direction and a radial direction, and
   wherein the second torsion spring is arranged within the spring envelope.

10. The VCR phasing system of claim 1, wherein the first torsion spring defines a first coil diameter, and the second torsion spring defines a second coil diameter, and
    wherein the first coil diameter is equal to the second coil diameter.

11. The VCR phasing system of claim 1, wherein the first torsion spring and the second torsion spring are arranged in a nested configuration.

12. The VCR phasing system of claim 11, wherein a coil of the second torsion spring is arranged axially between two adjacent coils of the first torsion spring.

13. A phasing system for varying a rotational relationship between a first rotary component and a second rotary component, the phasing system comprising:
    a gear hub;
    a cradle rotor;
    a spider rotor arranged between the gear hub and the cradle rotor, the spider rotor being configured to selectively lock and unlock relative rotation between the gear hub and the cradle rotor;
    a first torsion spring and a second torsion spring coupled between the gear hub and the cradle rotor, wherein the first torsion spring is configured to apply a first torque load between the gear hub and the cradle rotor; and a planetary actuator coupled to the gear hub and the spider rotor, the planetary actuator being operable between a steady-state mode where relative rotation between the gear hub and the cradle rotor is inhibited, and a phasing mode where the planetary actuator receives a rotary input at a predetermined magnitude to selectively provide a relative rotation between the gear hub and the cradle rotor.

14. The phasing system of claim 13, further comprising a spring sleeve coupled to the gear hub, wherein the spring sleeve extends axially away from the gear hub.

15. The phasing system of claim 14, wherein the first torsion spring and the second torsion spring each include a first coil end and a second coil end opposite the first coil end, and
wherein the first coil end of the first torsion spring and the first coil end of the second torsion spring are in engagement with the cradle rotor, and the second coil end of the first torsion spring and the second coil end of the second torsion spring are in engagement with a spring seat that is coupled to the spring sleeve.

16. The phasing system of claim 15, wherein the spring seat is configured to be rotationally locked with the spring sleeve in a plurality of rotational positions, such that each of the plurality of rotational positions defines a unique combined torque load from the first torsion spring and the second torsion spring.

17. The phasing system of claim 15, wherein the first torsion spring defines a first coil diameter, and the second torsion spring defines a second coil diameter, and
wherein the first coil diameter is equal to the second coil diameter.

18. The phasing system of claim 15, wherein the first torsion spring and the second torsion spring are arranged in a nested configuration, in which a coil of the second torsion spring is arranged axially between two adjacent coils of the first torsion spring.

19. A variable compression ratio (VCR) phasing system for varying a rotational relationship between a crank shaft and an eccentric shaft, the VCR phasing system comprising:

a gear hub configured to be in rotational communication with a crank shaft;

a cradle rotor configured to be in rotational communication with an eccentric shaft;

a spider rotor arranged between the gear hub and the cradle rotor, the spider rotor being configured to receive an input to selectively lock and unlock relative rotation between the gear hub and the cradle rotor;

a spring sleeve coupled to and rotationally fixed with the gear hub; and a first torsion spring coupled between the gear hub and the cradle rotor and a second torsion spring coupled between the gear hub and the cradle rotor, wherein the first and second torsion springs are configured to apply a combined torque load between the gear hub and the cradle rotor, wherein a preload of the first and second torsion springs is configured to be set by:
coupling first ends of the first and second torsion springs to the cradle rotor;
coupling opposing second ends of the first and second torsion springs to a spring seat; and
rotating the spring seat relative to the spring sleeve to selectively align at least one first slot among a plurality of first slots arranged on the spring sleeve with at least one second slot among a plurality of second slots arranged on the spring seat,
wherein the selective alignment of the at least one first slot and the at least one second slot is configured to rotationally lock the spring sleeve to the spring seat.

20. The VCR phasing system of claim 19, wherein when a phase angle between the gear hub and the cradle rotor is at a minimum phase angle, the combined torque load provided by the first and second torsion springs is at a minimum torque load; and
wherein as phase angle increases between the gear hub and the cradle rotor, the combined torque load provided by the first torsion spring and the second torsion spring increases.

* * * * *

UNITED STATES PATENT AND TRADEMARK OFFICE
CERTIFICATE OF CORRECTION

PATENT NO. : 11,970,987 B2
APPLICATION NO. : 18/122031
DATED : April 30, 2024
INVENTOR(S) : Curtis L. Van Weelden et al.

It is certified that error appears in the above-identified patent and that said Letters Patent is hereby corrected as shown below:

In the Specification

Column 18, Line 62, "by) 180°." should be "by 180°)."

Signed and Sealed this
Twelfth Day of November, 2024

Katherine Kelly Vidal
*Director of the United States Patent and Trademark Office*